United States Patent
Thoni et al.

(10) Patent No.: US 11,092,356 B2
(45) Date of Patent: Aug. 17, 2021

(54) HVAC ACTUATOR WITH REMOVABLE CARTRIDGE

(71) Applicant: Johnson Controls Technology Company, Auburn Hills, MI (US)

(72) Inventors: Mark A. Thoni, Pewaukee, WI (US); Jeff Papendorf, Greendale, WI (US); John T. Pierson, Whitefish Bay, WI (US); Hyunchul Kim, Chicago, IL (US); Thomas Richardson, Chicago, IL (US); Scott J. Thorne, Chicago, IL (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 202 days.

(21) Appl. No.: 15/967,016

(22) Filed: Apr. 30, 2018

(65) Prior Publication Data
US 2018/0313570 A1   Nov. 1, 2018

Related U.S. Application Data

(60) Provisional application No. 62/492,847, filed on May 1, 2017.

(51) Int. Cl.
*F24F 13/14* (2006.01)
*F24F 11/30* (2018.01)
(Continued)

(52) U.S. Cl.
CPC .......... *F24F 13/1426* (2013.01); *F16K 31/04* (2013.01); *F24F 11/30* (2018.01); *F24F 11/50* (2018.01); *F24F 11/88* (2018.01); *F24F 13/20* (2013.01); *F24F 2013/1433* (2013.01); *F24F 2013/1446* (2013.01); *F24F 2110/10* (2018.01); *F24F 2110/20* (2018.01); *F24F 2110/50* (2018.01); *F24F 2120/10* (2018.01); *F24F 2140/40* (2018.01); *F24F 2140/60* (2018.01)

(58) Field of Classification Search
CPC .. F24F 11/50; F24F 11/88; F24F 11/30; F24F 13/20; F16K 31/04
See application file for complete search history.

(56) References Cited

U.S. PATENT DOCUMENTS 4,485,846 A * 12/1984 Neff ...................... F15B 13/043
137/454.2
6,397,609 B1 * 6/2002 Shikata .............. B60H 1/00514
361/701
(Continued)

FOREIGN PATENT DOCUMENTS

EP    1138994    10/2001
EP    1418373    5/2004
(Continued)

OTHER PUBLICATIONS

Search Report for International Application No. PCT/US2018/030150, dated Jul. 19, 2018, 14 pages.

*Primary Examiner* — Said Bouziane
(74) *Attorney, Agent, or Firm* — Foley & Lardner LLP

(57) ABSTRACT

An actuator for a HVAC system includes a base having a motor and a drive device driven by the motor and configured to be coupled to a movable HVAC component for driving the movable HVAC component between multiple positions, and a removable cartridge removably attached to the base.

20 Claims, 33 Drawing Sheets

(51) Int. Cl.
  *F24F 11/50* (2018.01)
  *F24F 11/88* (2018.01)
  *F16K 31/04* (2006.01)
  *F24F 13/20* (2006.01)
  *F24F 140/60* (2018.01)
  *F24F 110/10* (2018.01)
  *F24F 110/20* (2018.01)
  *F24F 110/50* (2018.01)
  *F24F 120/10* (2018.01)
  *F24F 140/40* (2018.01)

(56) References Cited

U.S. PATENT DOCUMENTS

| | | | |
|---|---|---|---|
| 6,422,532 B1* | 7/2002 | Garner | F16K 37/0058 137/487.5 |
| 2006/0102006 A1* | 5/2006 | Powell | B01D 46/008 96/429 |
| 2013/0337736 A1* | 12/2013 | Marak | F24F 11/72 454/317 |
| 2015/0108687 A1* | 4/2015 | Snyder | B29C 64/20 264/308 |
| 2015/0168006 A1 | 6/2015 | Du et al. | |
| 2016/0308473 A1 | 10/2016 | Alexander et al. | |
| 2017/0146256 A1 | 5/2017 | Alexander et al. | |
| 2018/0094737 A1 | 4/2018 | Clement et al. | |
| 2018/0268872 A1* | 9/2018 | Gale | G11B 15/68 |

FOREIGN PATENT DOCUMENTS

| | | |
|---|---|---|
| EP | 3173705 | 5/2017 |
| EP | 3306152 | 4/2018 |
| GB | 2396758 | 6/2004 |
| WO | WO 2017/155682 | 9/2017 |

\* cited by examiner

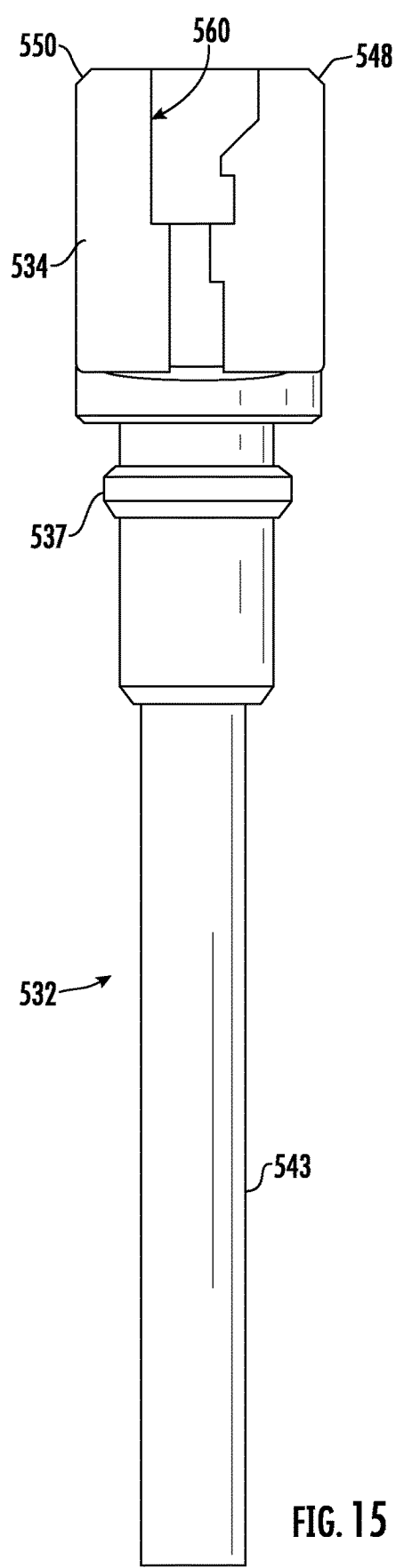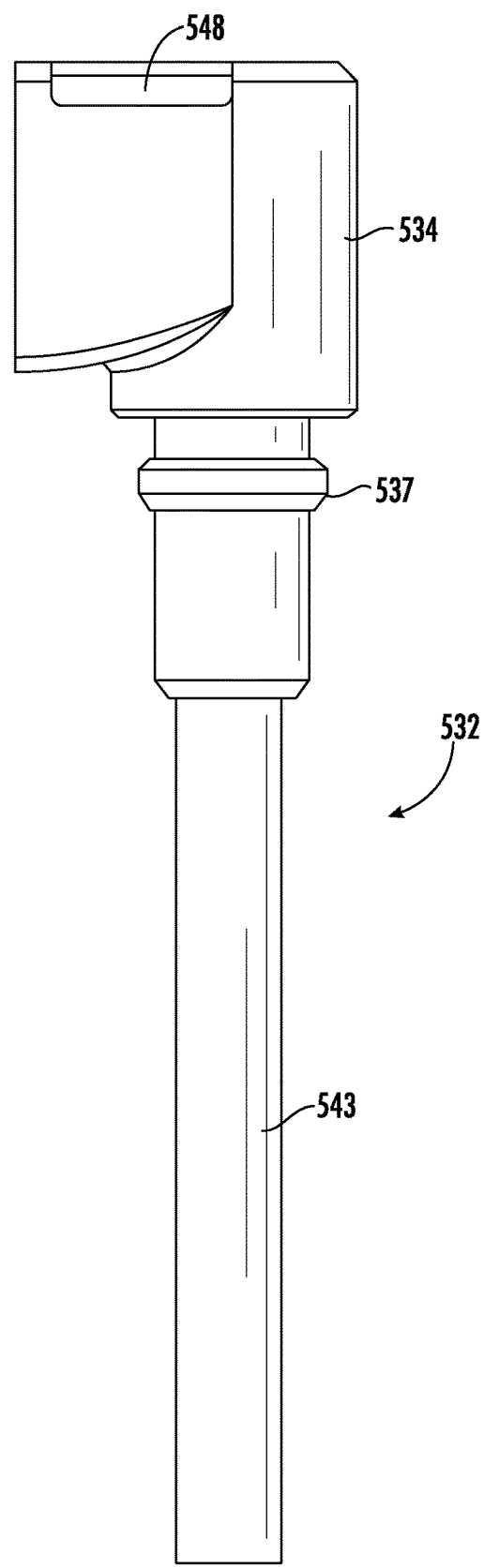
FIG. 15
FIG. 16

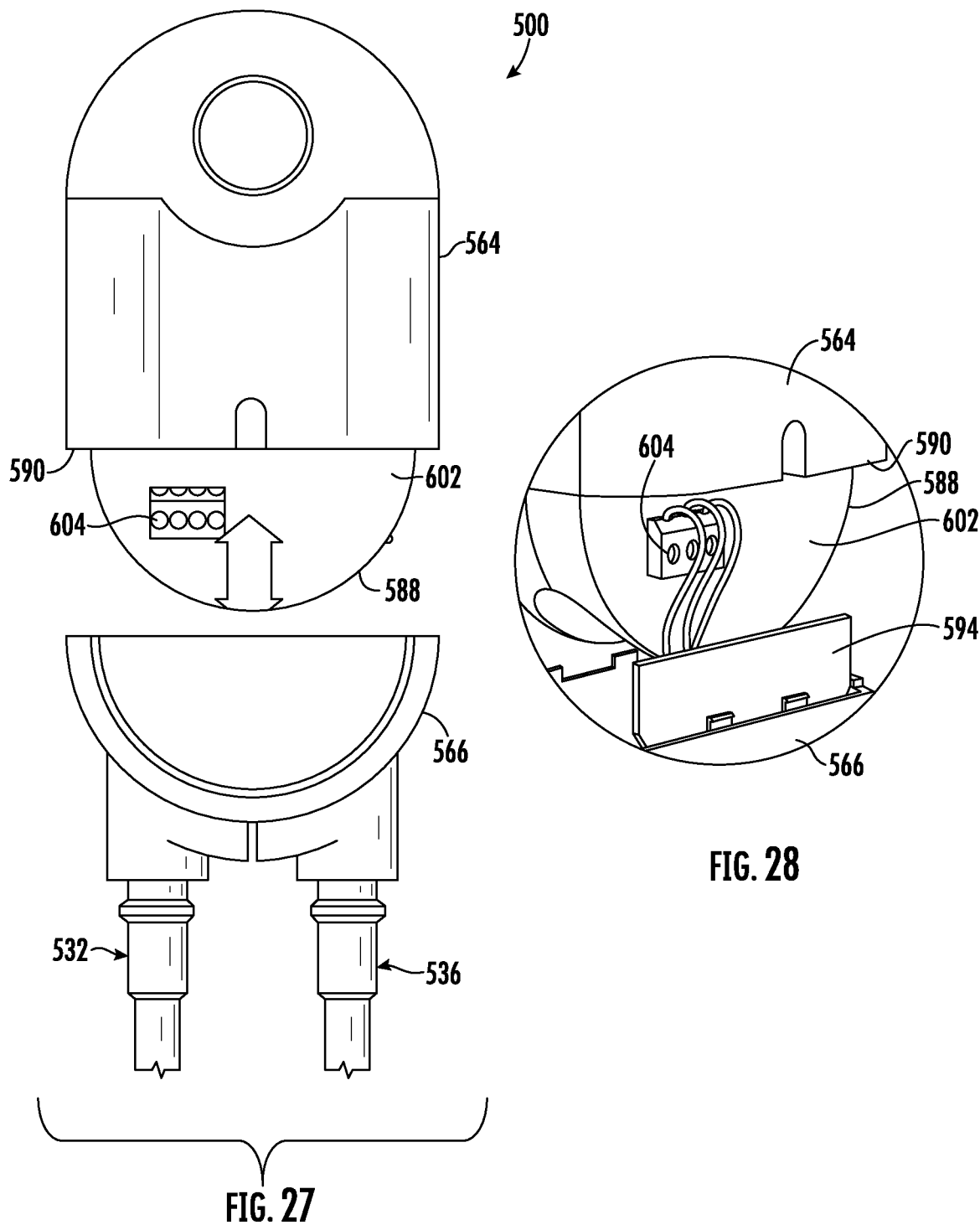

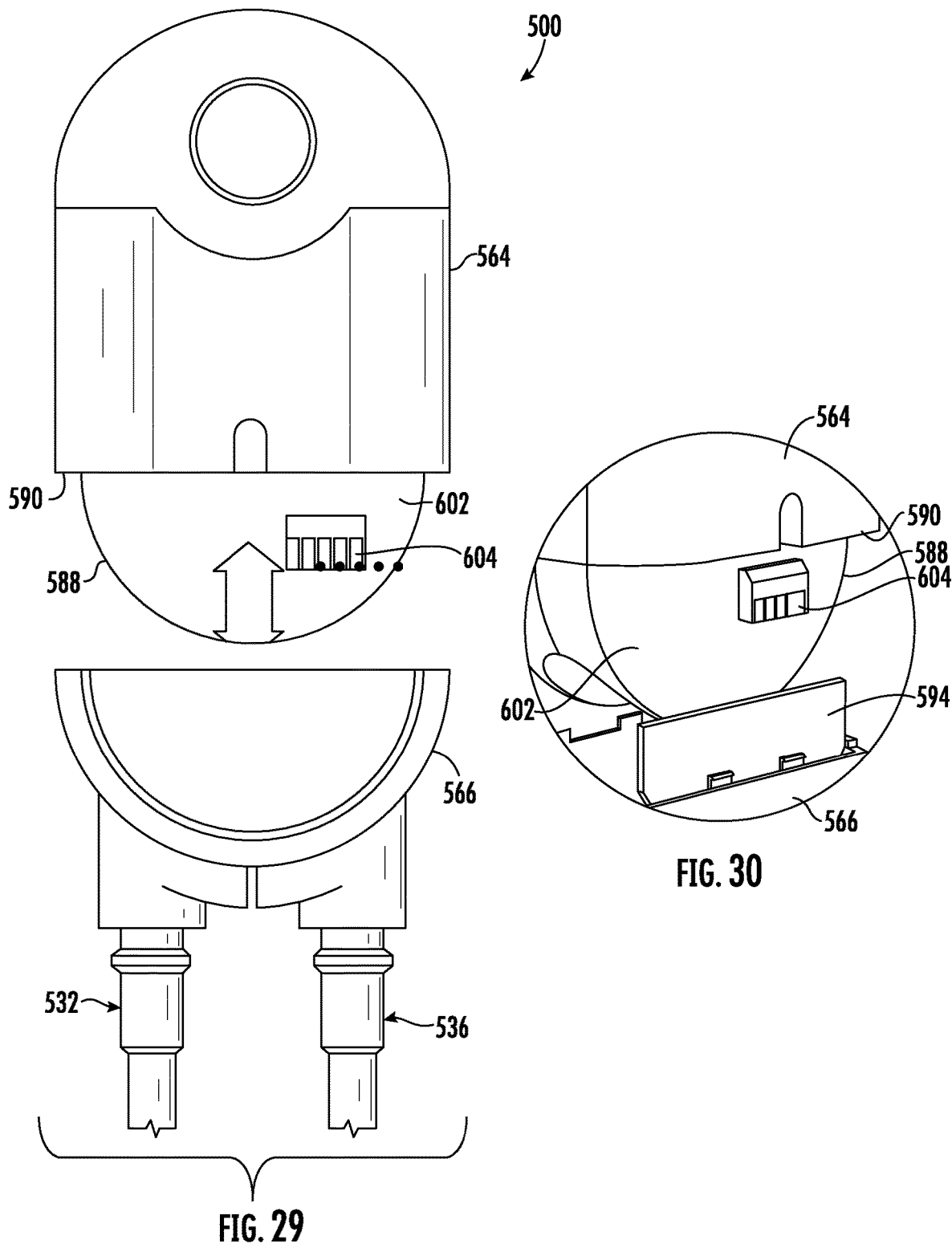

HVAC ACTUATOR WITH REMOVABLE CARTRIDGE

CROSS-REFERENCE TO RELATED PATENT APPLICATIONS

This application claims the benefit of U.S. Application No. 62/492,847, filed May 1, 2017, which is incorporated herein by reference in its entirety.

BACKGROUND

The present invention relates generally to actuators in a heating, ventilating, or air conditioning (HVAC) system.

HVAC actuators are used to operate a wide variety of HVAC components such as air dampers or louvers, fluid valves, air handling units, and other components that are typically used in HVAC systems. For example, an actuator may be coupled to a damper in a HVAC system and may be used to drive the damper between an open position and a closed position. A HVAC actuator typically includes a motor and a drive device (e.g., a hub, a drive train, etc.) that is driven by the motor and coupled to the HVAC component.

SUMMARY

One embodiment of the invention relates to an actuator for an HVAC system where the actuator includes a base and a removable cartridge removably attached to the base. The base includes a motor and a drive device driven by the motor and configured to be coupled to a movable HVAC component for driving the movable HVAC component between multiple positions.

Another embodiment of the invention relates to an actuator for an HVAC system where the actuator includes a base and a removable cartridge removably attached to the base, wherein the cartridge includes a cartridge processing circuit. The base includes a motor and a drive device driven by the motor and configured to be coupled to a movable HVAC component for driving the movable HVAC component between multiple positions.

Another embodiment of the invention relates to an actuator for an HVAC system where the actuator includes a base including a drive device configured to be coupled to a movable HVAC component for driving the movable HVAC component between multiple positions and a removable cartridge removably attached to the base, wherein the cartridge includes a transmission having an output connected to the drive device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 15 is a front view of the wiring harness of FIG. 14.

FIG. 16 is a right side view of the wiring harness of FIG. 14.

FIG. 27 is an exploded front view of an actuator, according to an exemplary embodiment.

FIG. 28 is a detail view of a portion of the actuator of FIG. 27.

FIG. 29 is an exploded front view of an actuator, according to an exemplary embodiment.

FIG. 30 is a detail view of a portion of the actuator of FIG. 29.

DETAILED DESCRIPTION

Referring generally to the FIGURES, a HVAC actuator with soft stall control is shown, according to an exemplary embodiment. The actuator may be a damper actuator, a valve actuator, a fan actuator, a pump actuator, or any other type of actuator that can be used in a HVAC system.

The actuator includes a motor and a drive device driven by the motor. In some embodiments, the motor is a brushless direct current (BLDC) motor. The drive device is coupled to a movable HVAC component for driving the movable HVAC component between multiple positions. The actuator further includes a main actuator controller and a pulse width modulation (PWM) speed controller. The main actuator controller may determine an appropriate speed setpoint for the motor and may provide the speed setpoint to the PWM speed controller. The PWM speed controller may generate a PWM output having a duty cycle based on the speed setpoint and may provide the PWM output to the motor (e.g., via a motor drive inverter).

The actuator is configured to perform a soft stall process when approaching an end stop. The main actuator controller determines when the drive device is approaching an end stop. The PWM speed controller sets the PWM output to zero in response to a determination that the drive device is approaching the end stop. Setting the PWM output to zero stops motor commutation and causes the drive device to stop before reaching the end stop. The PWM speed controller then increases the PWM speed output until the end stop is reached, thereby causing the speed of the motor to increase as the drive device approaches the end stop.

Unlike conventional techniques which merely slow down the speed of the motor as the drive device approaches an end stop, the soft stall process described herein completely stops motor commutation. Once the motor has completely stopped, the main actuator controller causes the PWM output provided to the motor to increase (e.g., ramp-up), which increases the speed of the motor until the mechanical end of travel is reached. As such, the main actuator controller does not slow down the speed of the motor while approaching an end stop, but rather completely stops the motor and then increases the speed of the motor until the end stop is reached. Advantageously, the soft stall process described herein substantially reduces the impulse force seen at the mechanical end stop relative to conventional motor slowing techniques. The soft stall process may increase the longevity of the mechanical gear train and other actuator components without the need to change the physical design of the actuator.

Building Management System and HVAC System

Figure 1:
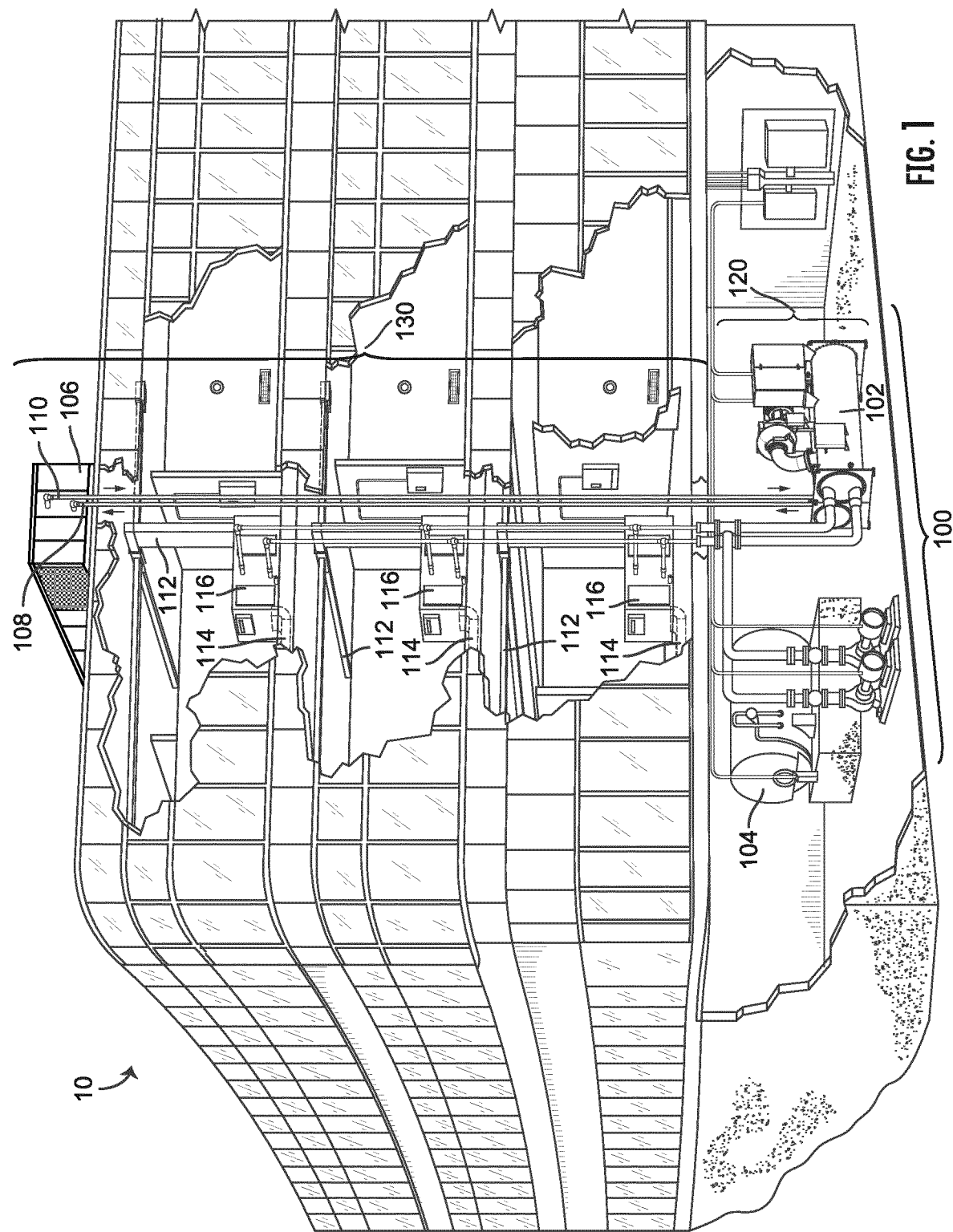
FIG. 1 is a drawing of a building equipped with a heating, ventilating, or air conditioning (HVAC) system and a building management system (BMS), according to an exemplary embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
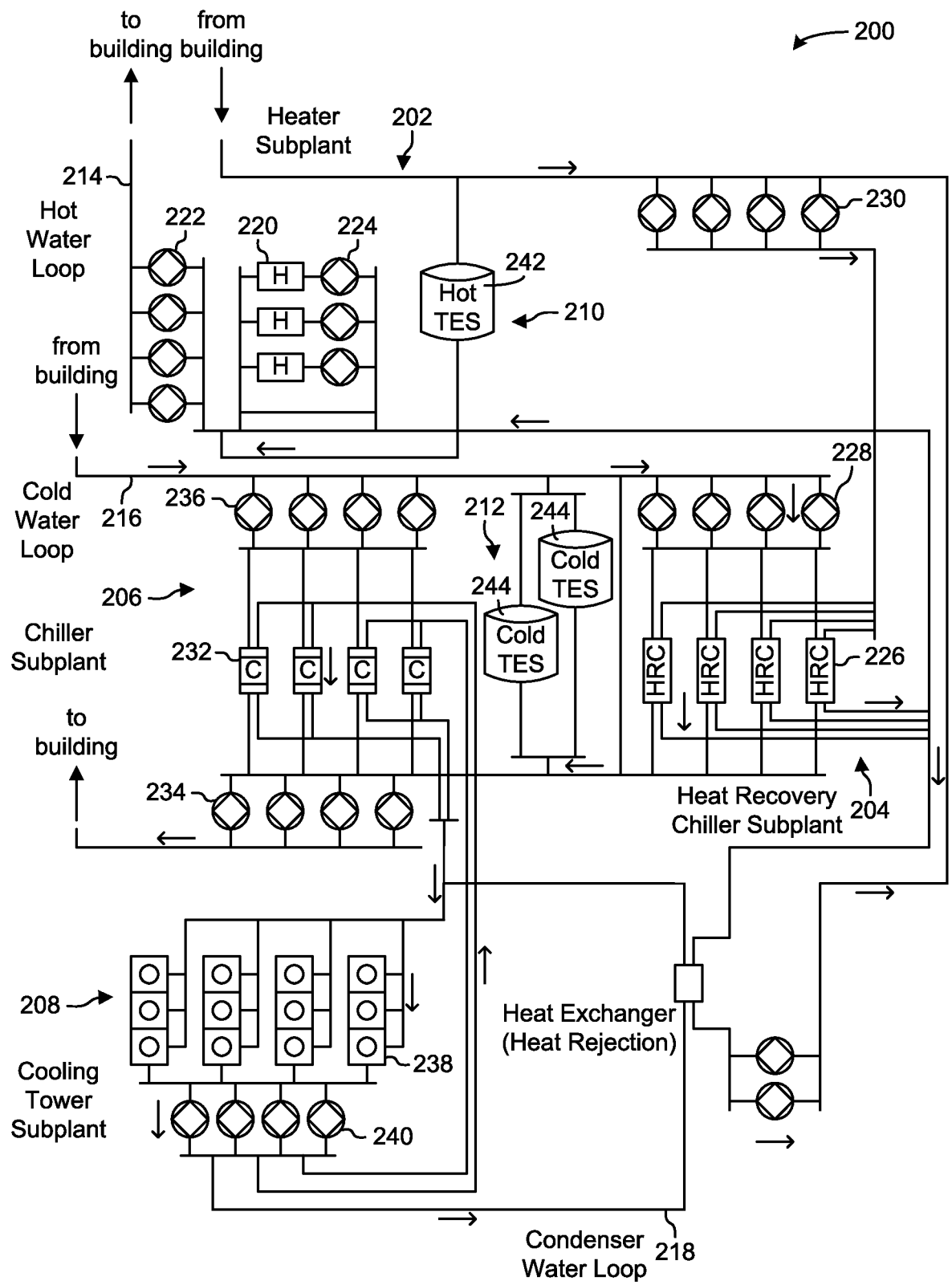
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
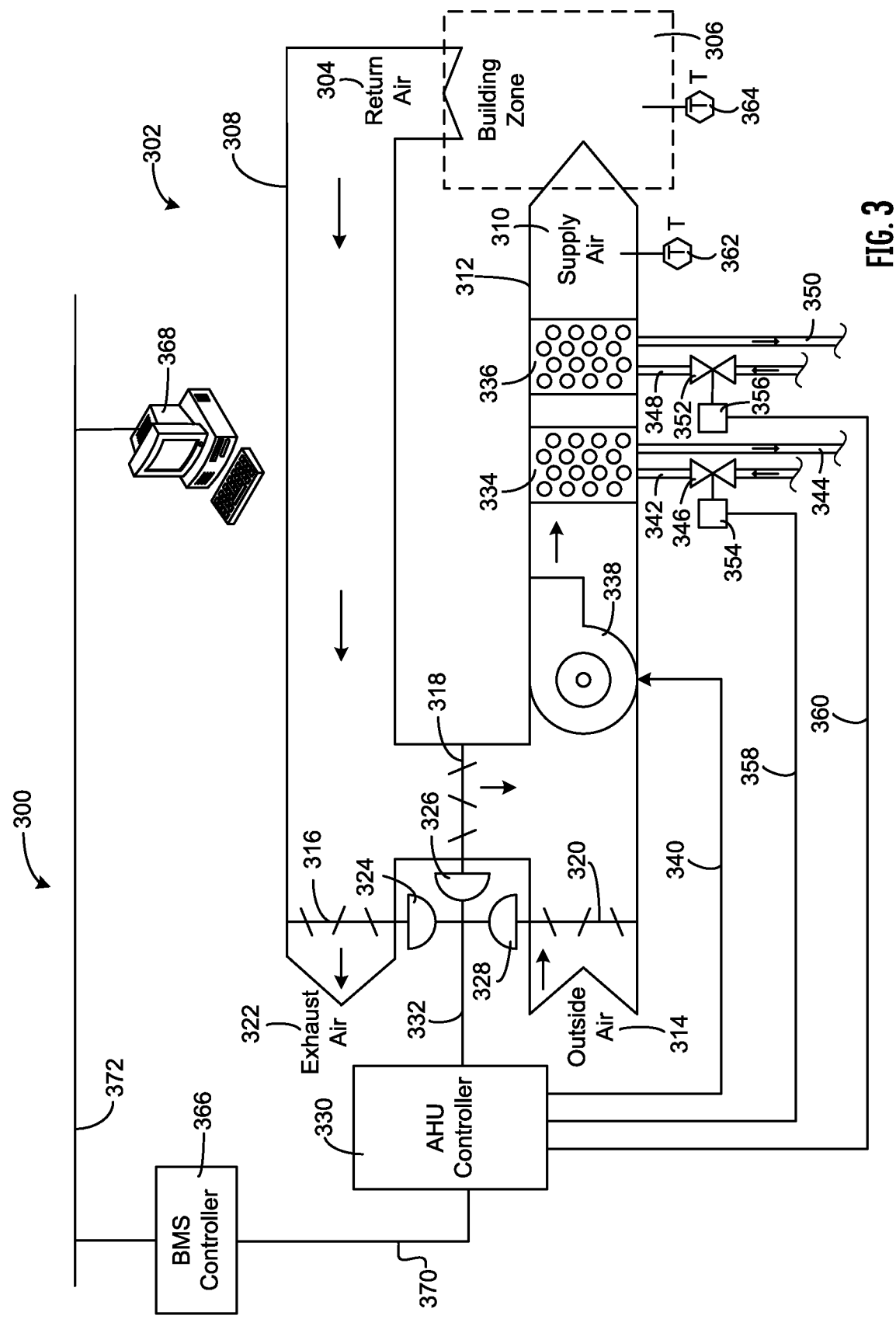
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
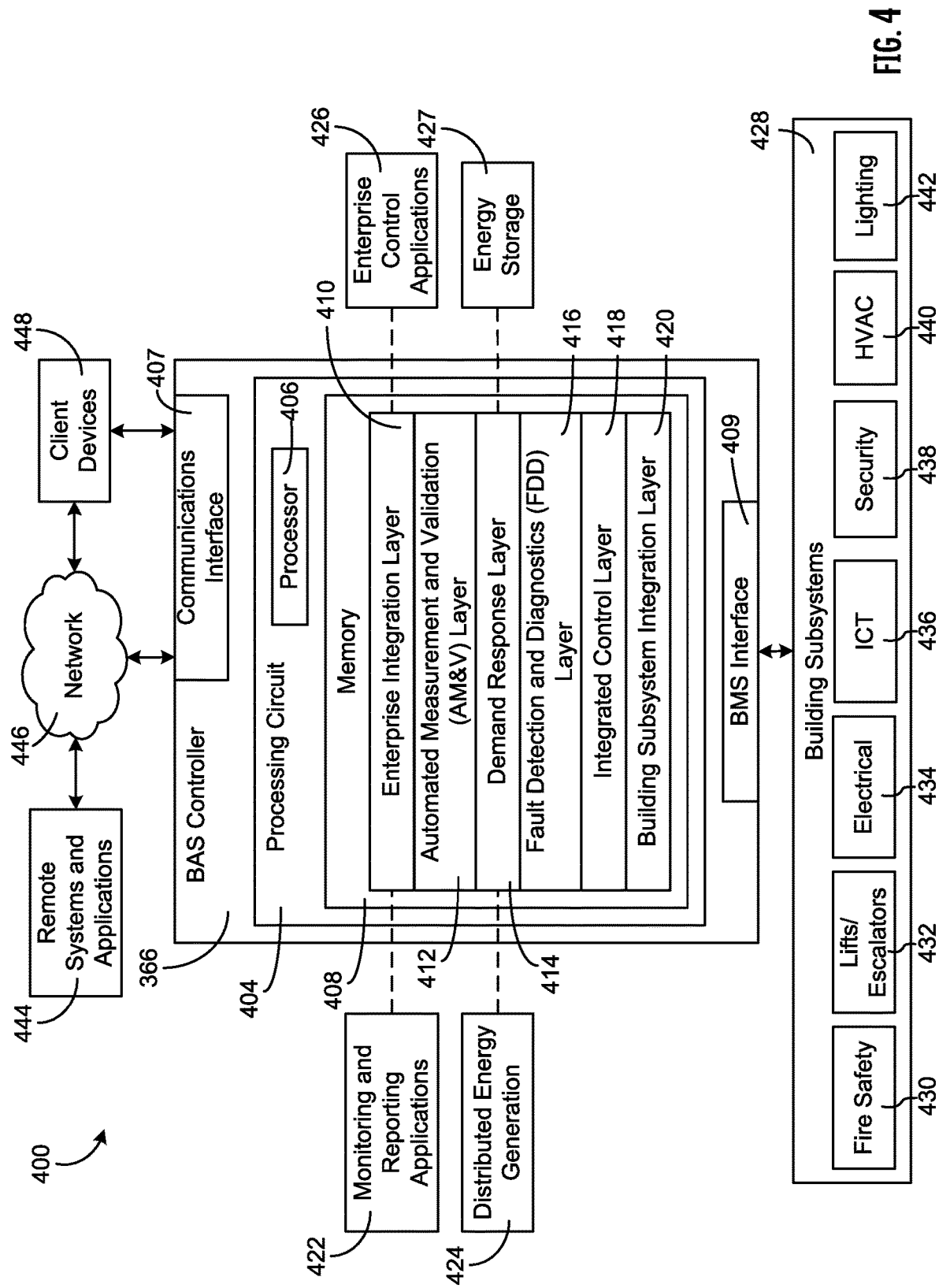
FIG. 4 is a block diagram of a BMS which may be implemented in the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

HVAC Actuators and Interchangeable Wiring Harness

Referring now to FIGS. 5-15, an actuator 500 for use in a HVAC system is shown, according to an exemplary embodiment. In some implementations, actuator 500 may be used in HVAC system 100, waterside system 200, airside system 300, or BMS 400, as described with reference to FIGS. 1-4. For example, actuator 500 may be a damper actuator, a louver actuator a valve actuator, a fan actuator, a pump actuator, or any other type of actuator that can be used in a HVAC system or BMS.

Figure 5:
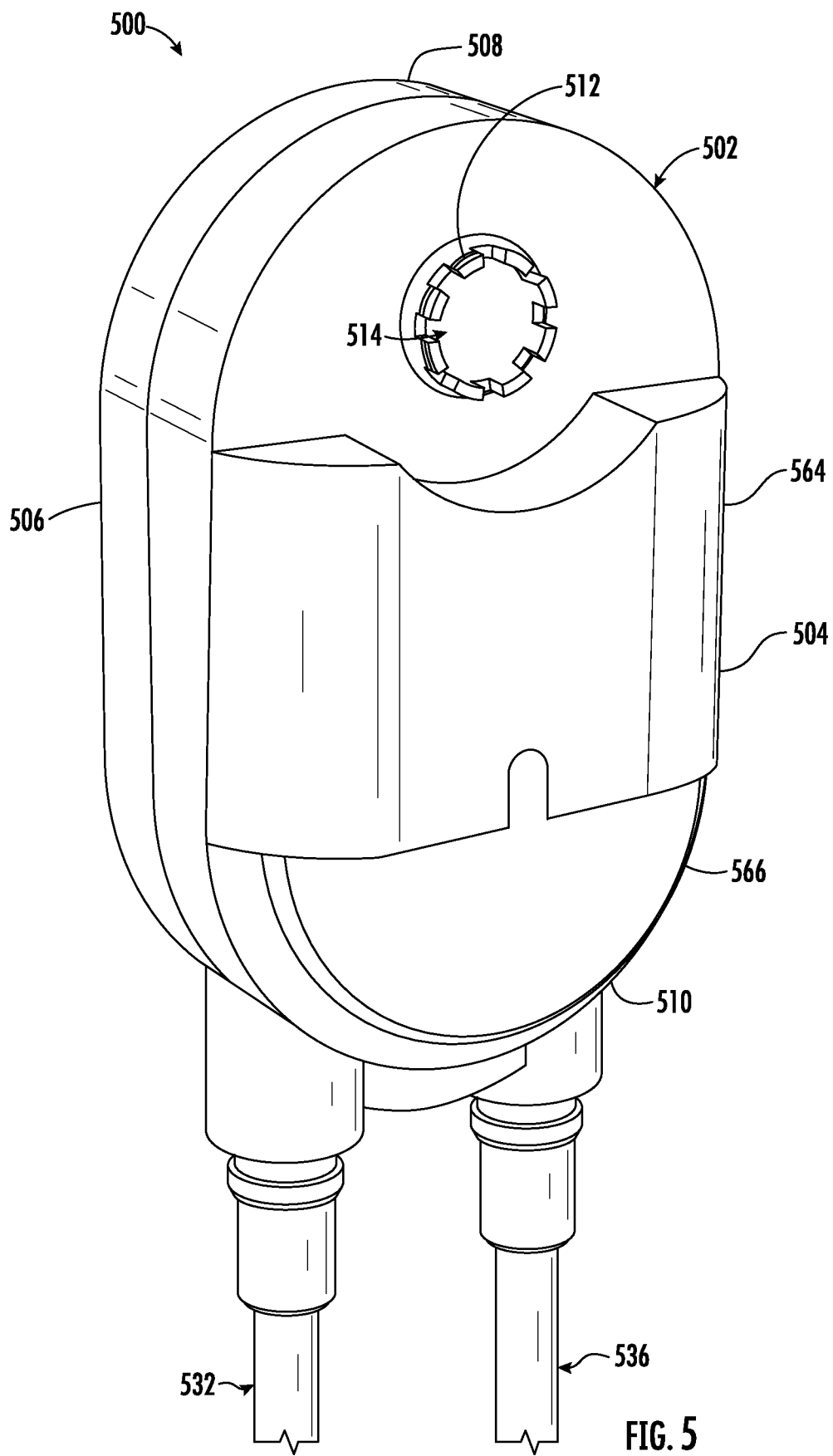
FIG. 5 is a perspective view of an HVAC actuator, according to an exemplary embodiment.
Figure 6:
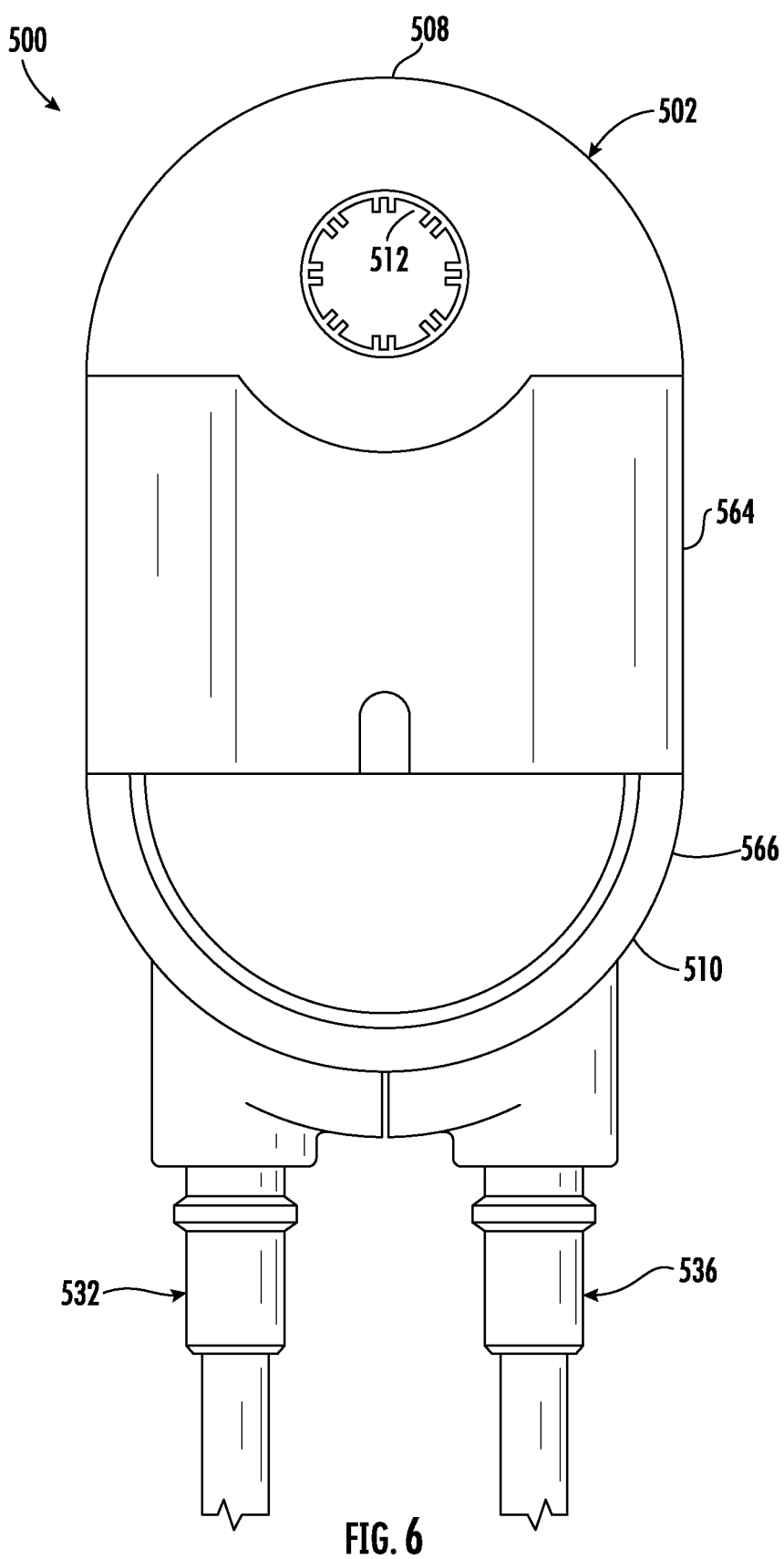
FIG. 6 is a front view of the HVAC actuator of FIG. 5.
Figure 7:
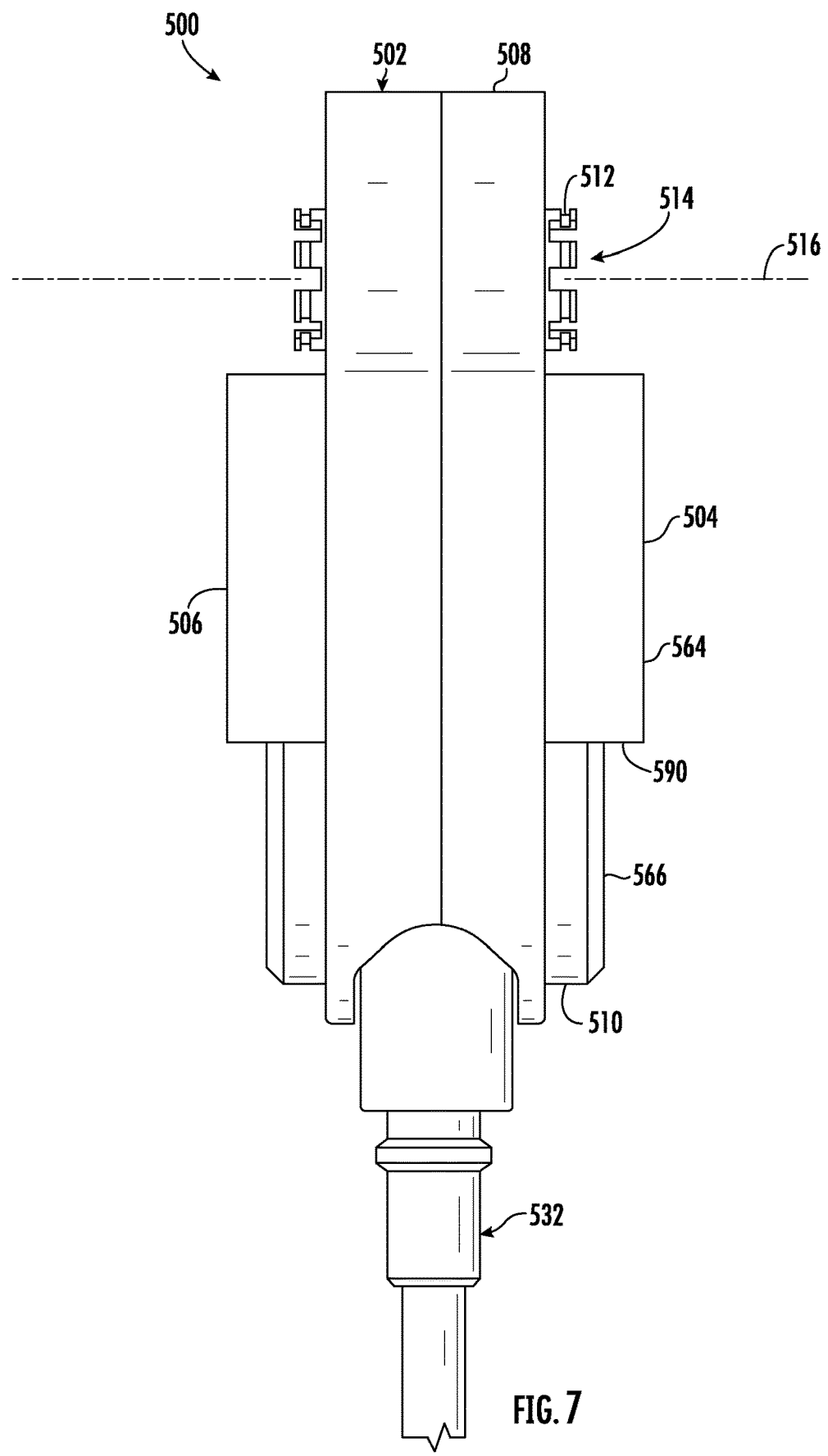
FIG. 7 is a left side view of the HVAC actuator of FIG. 5.

Referring to FIGS. 5-7, actuator 500 is shown to include a housing 502 having a front side 504, a rear side 506, a top side 508, and a bottom side 510 when actuator 500 is positioned in the operating position shown in FIG. 5. In use, actuator 500 may be positioned in different operating positions than the one shown in FIG. 5. The housing 502 contains and/or supports the operational components of actuator 500 (e.g., motor, drive shaft, processing circuit, transmission or gearbox, power transformer, inverter, or other device for transforming, converting, and/or conditioning electrical power, electrical contacts, etc.).

Actuator 500 includes a drive device, illustrated as drive hub or drive shaft 512. Drive shaft 512 defines a centrally-located opening 514 configured to receive a shaft of a damper, a valve, or other movable HVAC system component. The shaft of the movable HVAC system component is secured to draft shaft 512 so that rotation of the drive shaft 512 about axis of rotation 516 (FIG. 7) rotates the shaft of the HVAC system component. Drive shaft 512 may be secured to the shaft of the HVAC system component by a collar, combination of bolt and nut, or other appropriate mechanical fastener. In some embodiments, a transmission is provided between drive shaft 512 and the shaft of the HVAC system component. The transmission may change the ratio of rotation (e.g., gear ratio) between drive shaft 512 and the shaft of the HVAC system component. Drive shaft 512 may include a spring or other biasing member configured to return drive shaft 512 to a home position so that actuator 500 is considered to be a spring return actuator. In some embodiments, the drive device is a different than drive shaft 512 and may be a linear drive device that moves linearly along a drive axis so that the actuator 500 is considered to be a linear actuator. The linear drive device is secured to a linearly movable shaft or other member of a movable HVAC system component to that movement of the linear drive device causes movement of the shaft of the movable HVAC system component.

Figure 8:
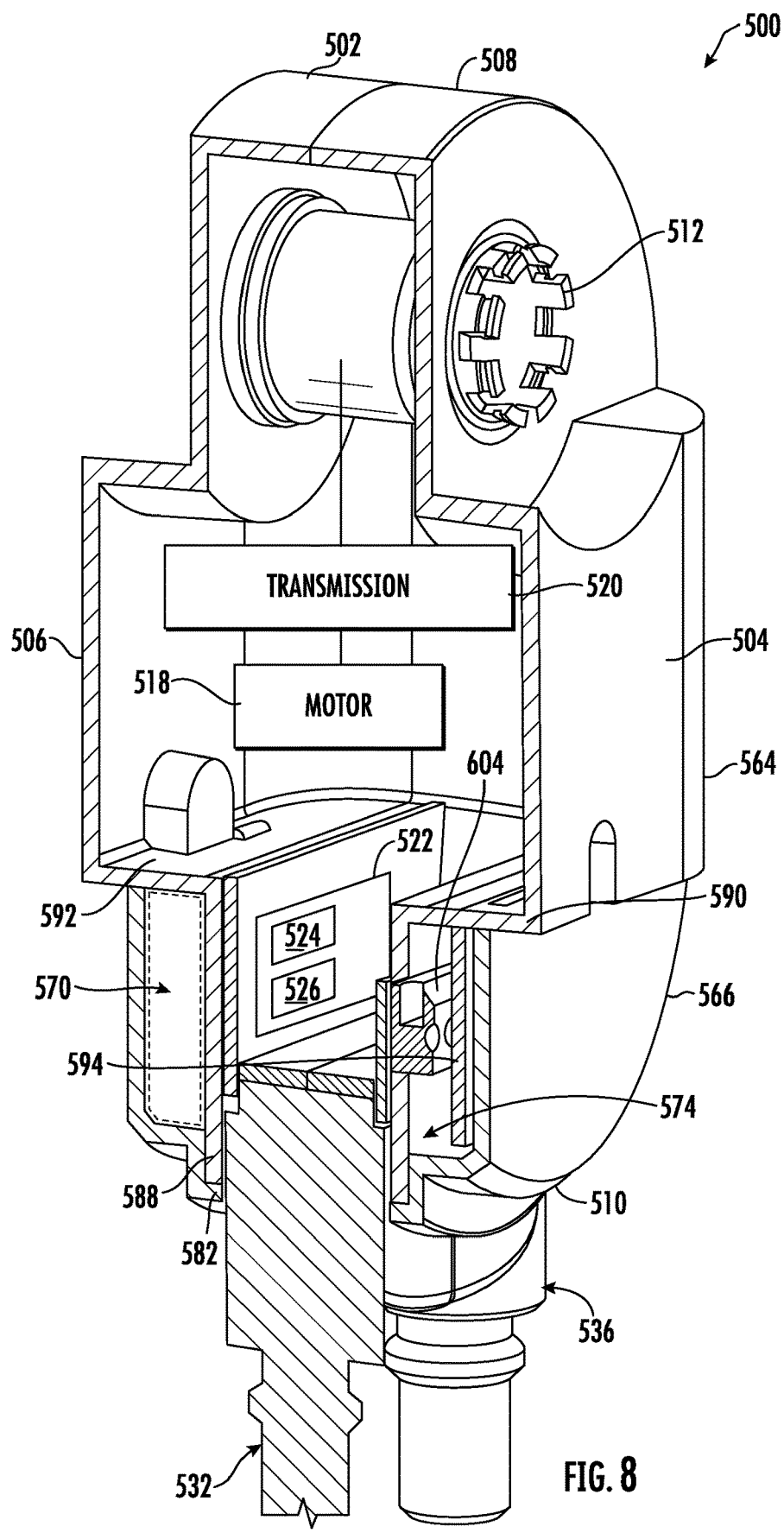
FIG. 8 is a cross-sectional view of the HVAC actuator of FIG. 5.
Figure 9:
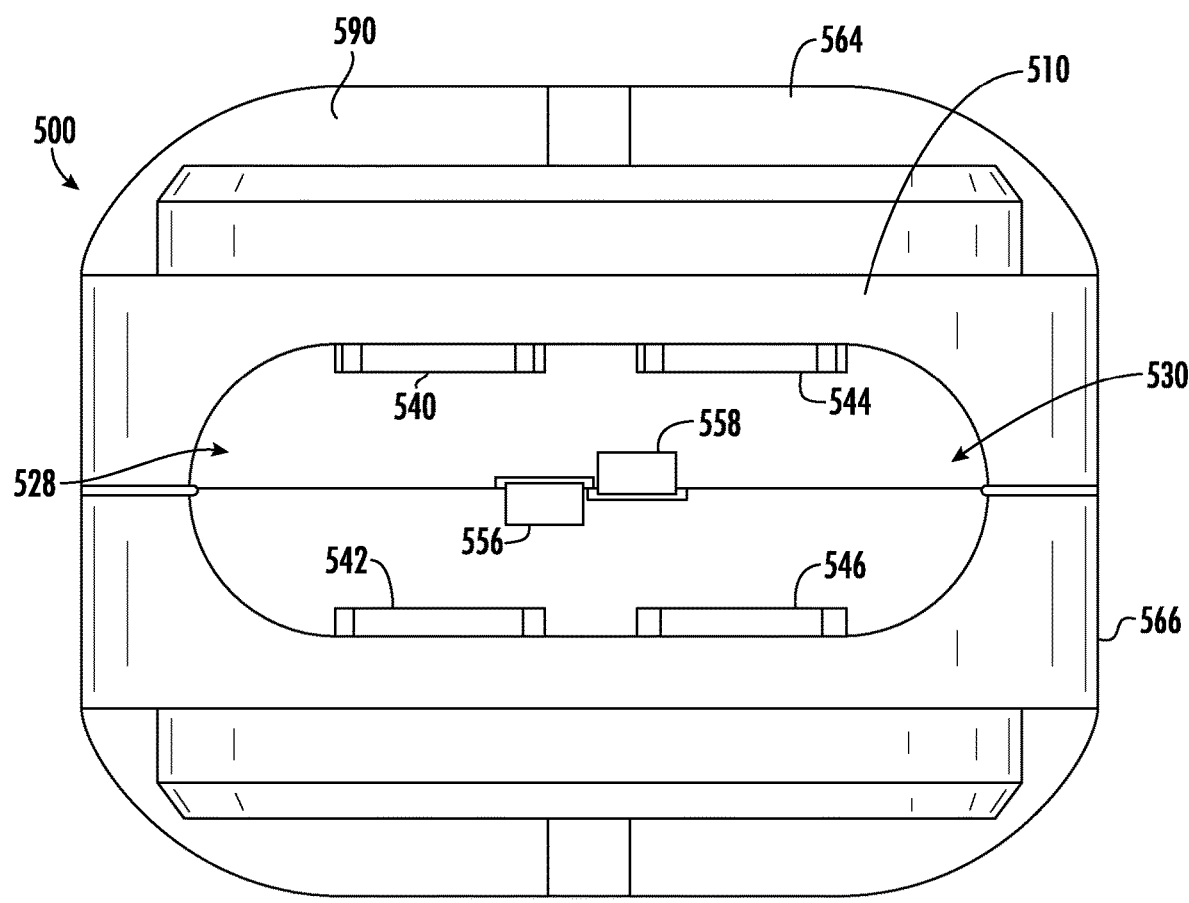
FIG. 9 is a bottom view of the HVAC actuator of FIG. 5.
Figure 10:
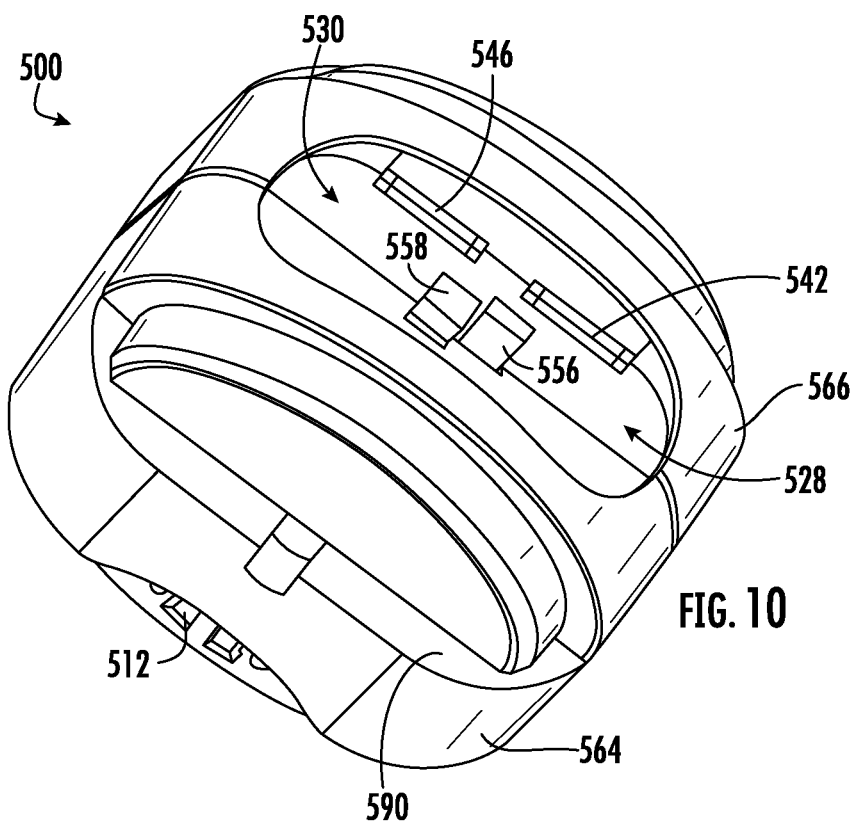
FIG. 10 is a bottom perspective view of the HVAC actuator of FIG. 5.
Figure 11:
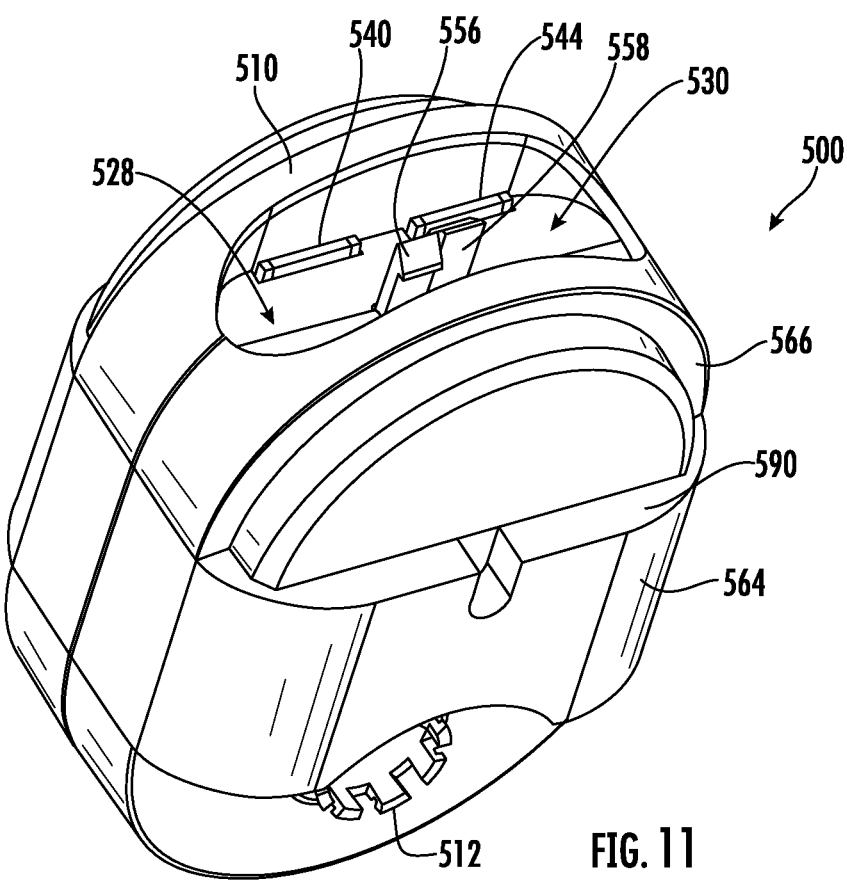
FIG. 11 is another bottom perspective view of the HVAC actuator of FIG. 5.

Referring to FIG. 8, actuator 500 also includes a motor 518 (e.g. a brushless direct current (BLDC) motor) configured to drive drive shaft 512 or other drive device. In some embodiments, motor 518 is connected to drive shaft 512 by a gear box or transmission 520. Transmission 520 may change the ratio of rotation between the output shaft of motor 518 and drive shaft 512 (e.g., the gear reduction ratio). For example, in some embodiments, transmission 520 causes drive shaft 512 to rotate at a higher rotational speed than the output shaft of motor 518 and in other embodiments causes drive shaft 512 to rotate at a lower rotational speed than the output shaft of motor 518. In other embodiments, transmission 520 causes drive shaft 512 to rotate at the same rotational speed as the output shaft of motor 518. In other embodiments, transmission 520 is omitted and motor 518 is directly attached to drive shaft 512.

Referring to FIG. 8, actuator 500 includes a processing circuit 522 configured to control motor 518 and other electronic components of the actuator. The processing circuit 522 includes a processor 524 and a memory 526. Processor 524 can be implemented as a general purpose processor, an application specific integrated circuit (ASIC), one or more field programmable gate arrays (FPGAs), a group of processing components, or other suitable electronic processing components.

Memory 526 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 526 may be or include volatile memory or non-volatile memory. Memory 526 may include database components, object code components, script components, or any other type of information structure for supporting the various activities and information structures described in the present application. According to an exemplary embodiment, memory 526 is communicably connected to processor 524 via processing circuit 522 and includes computer code for executing (e.g., by processing circuit 522 and/or processor 524) one or more processes described herein. Memory 526 may include one or more actuator control modules configured to implement the various actuator control schemes described herein.

Figure 12:
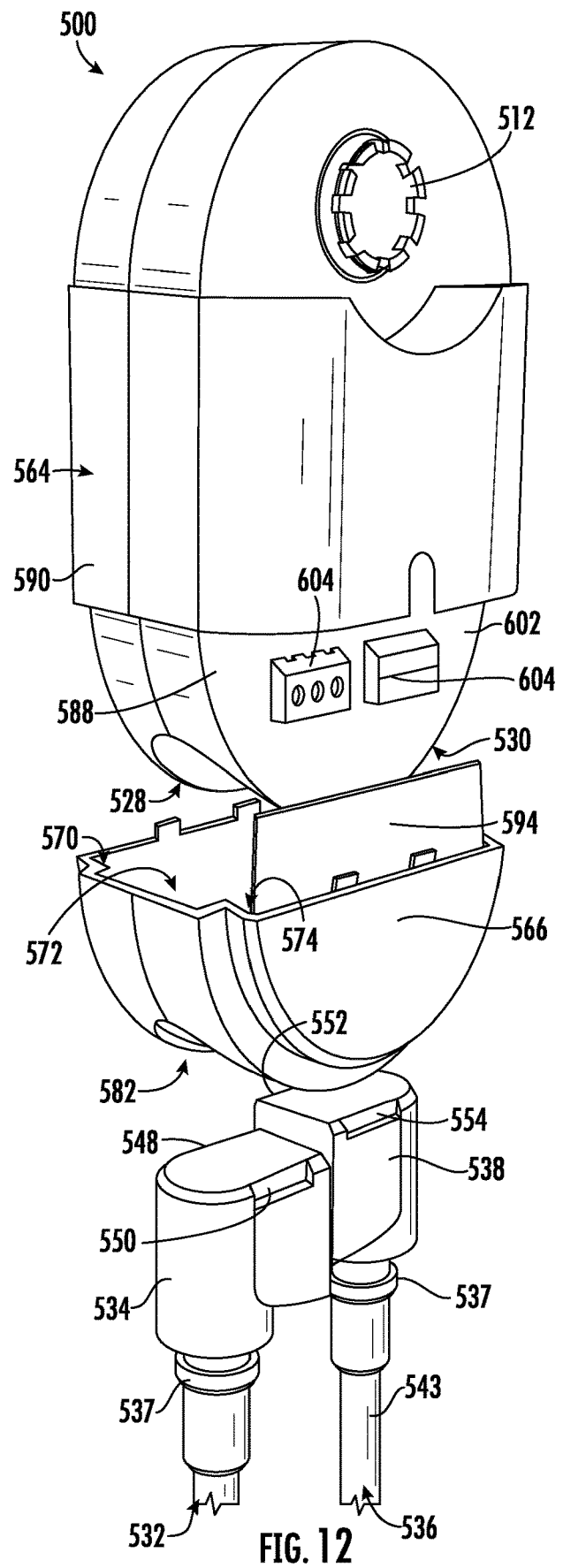
FIG. 12 is an exploded perspective view of the HVAC actuator of FIG. 5.
Figure 13:
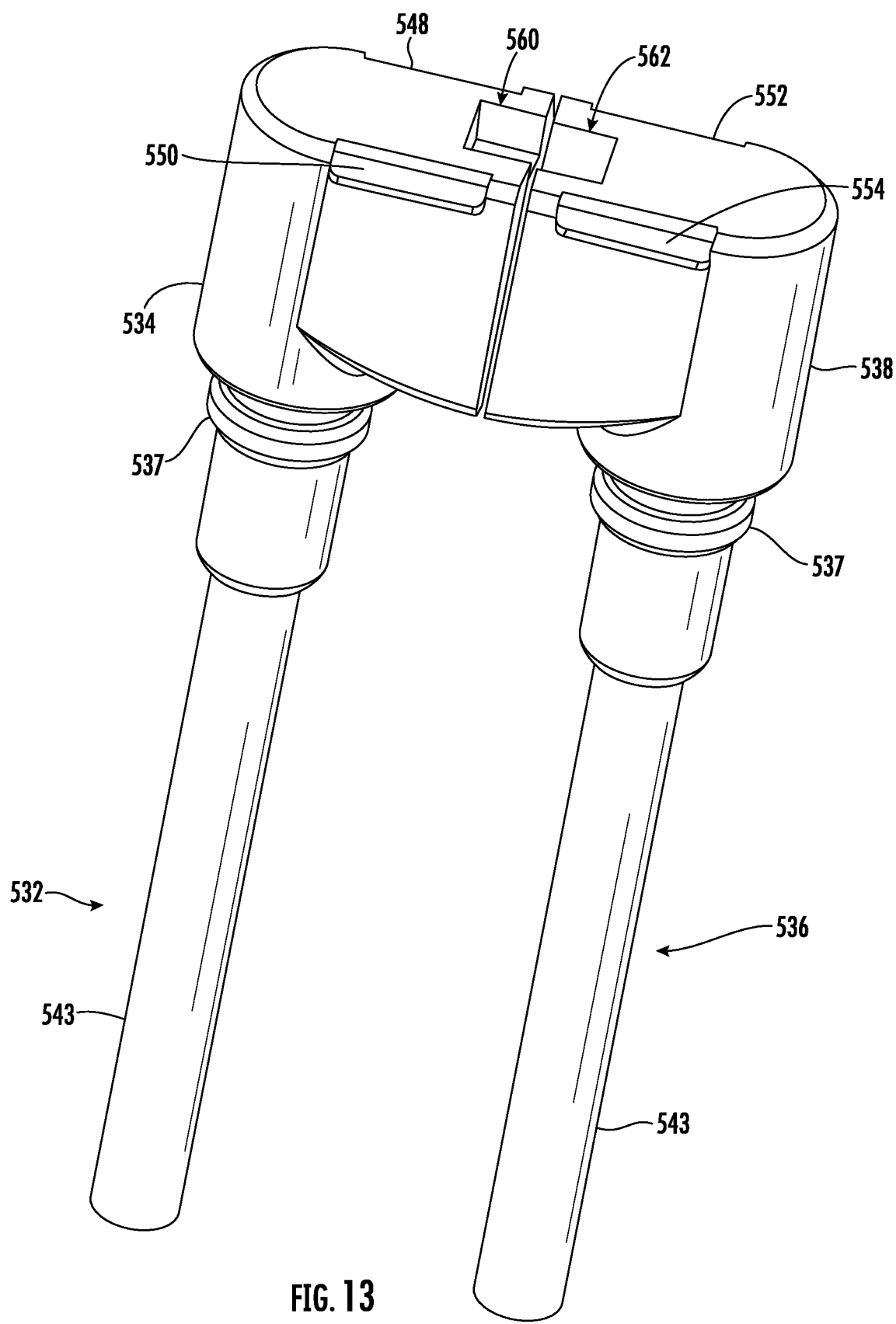
FIG. 13 is a perspective view of two wiring harnesses for use with the HVAC actuator of FIG. 5 and the HVAC actuator of FIG. 37.
Figure 14:
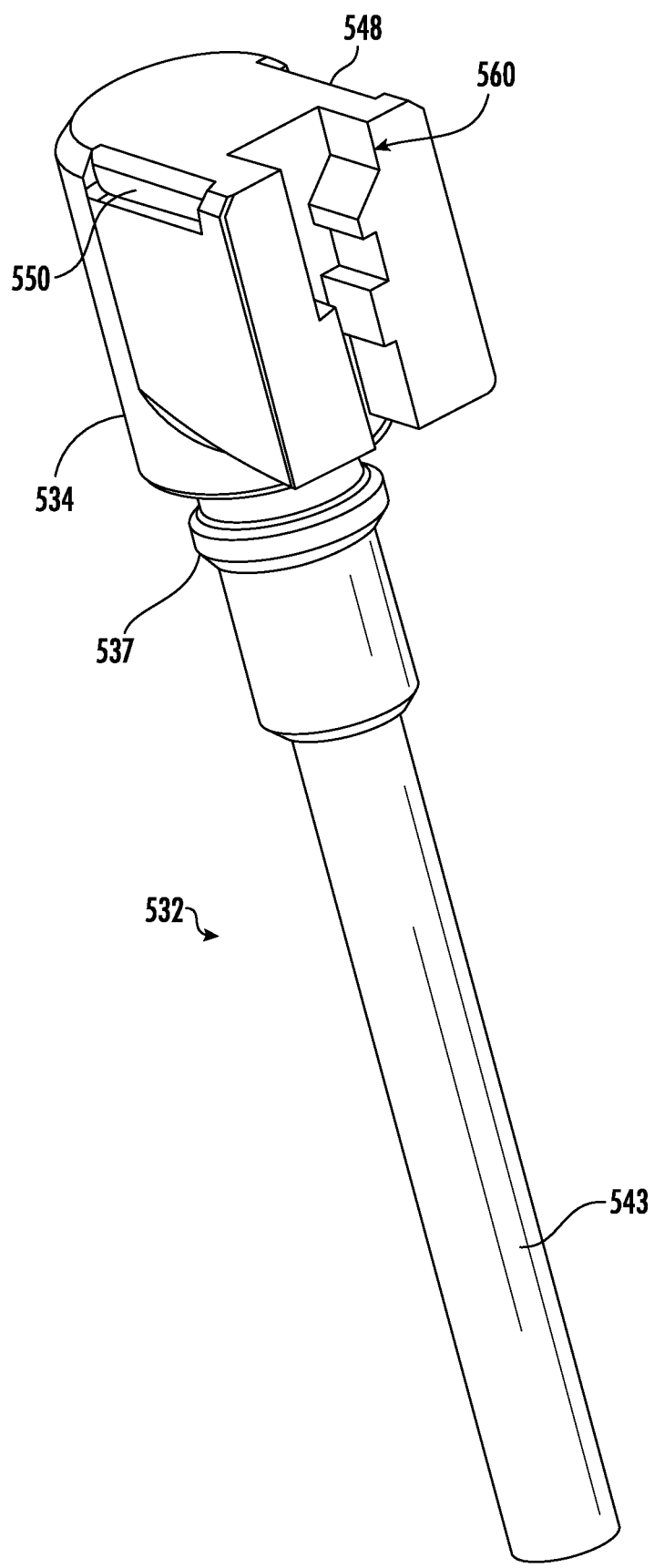
FIG. 14 is a perspective view of one wiring harness of FIG. 13.
Figure 17:
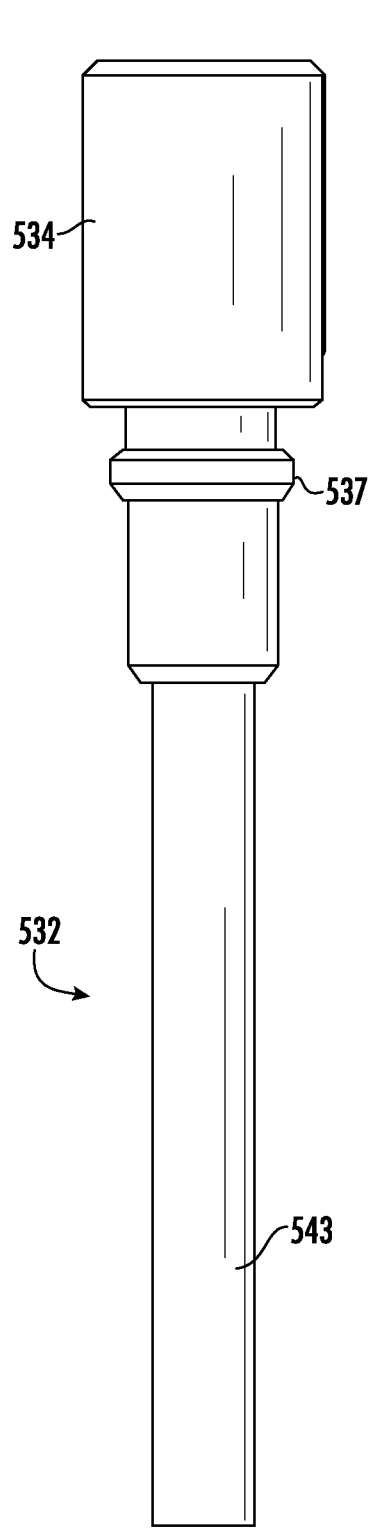
FIG. 17 is a rear view of the wiring harness of FIG. 14.
Figure 18:
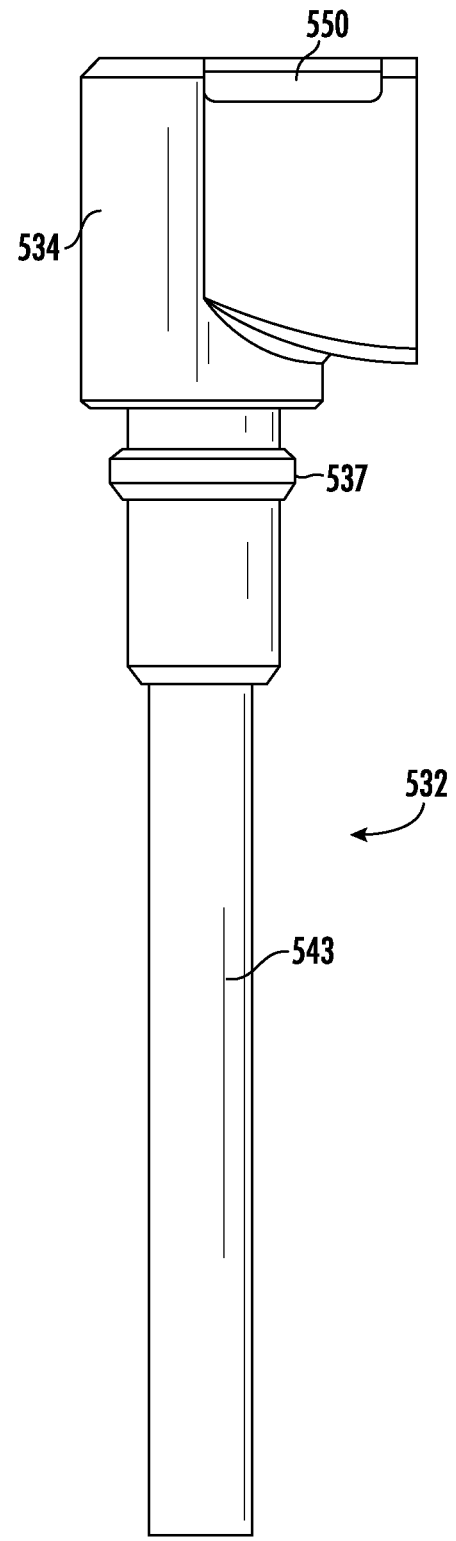
FIG. 18 is a left side view of the wiring harness of FIG. 14.
Figure 19:
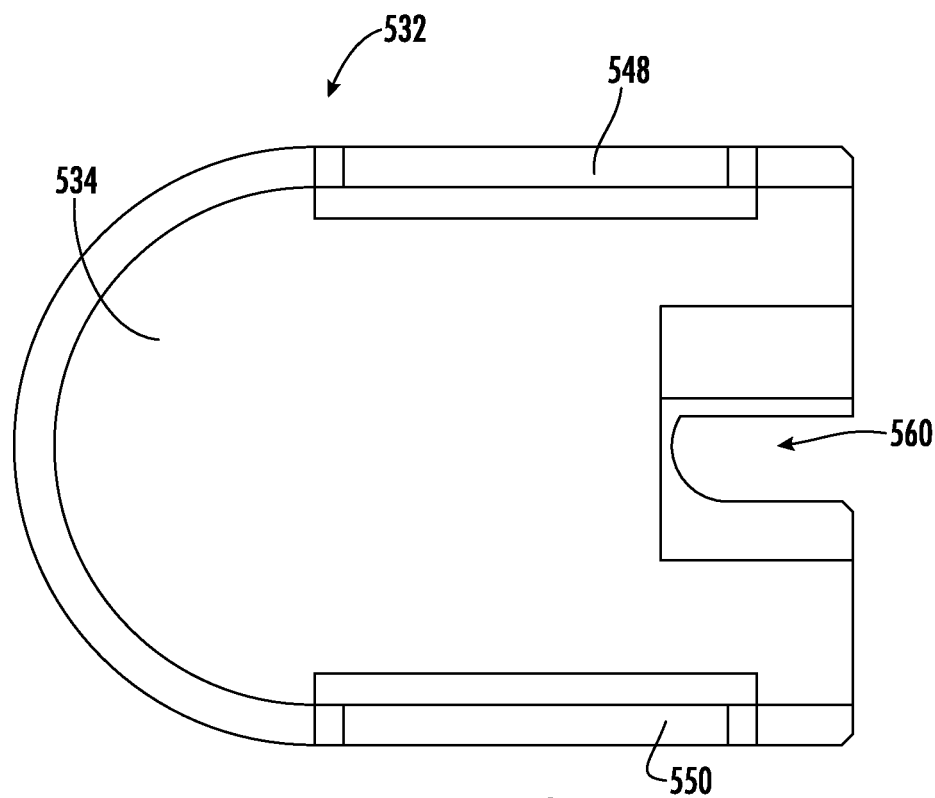
FIG. 19 is a top view of the wiring harness of FIG. 14.
Figure 20:
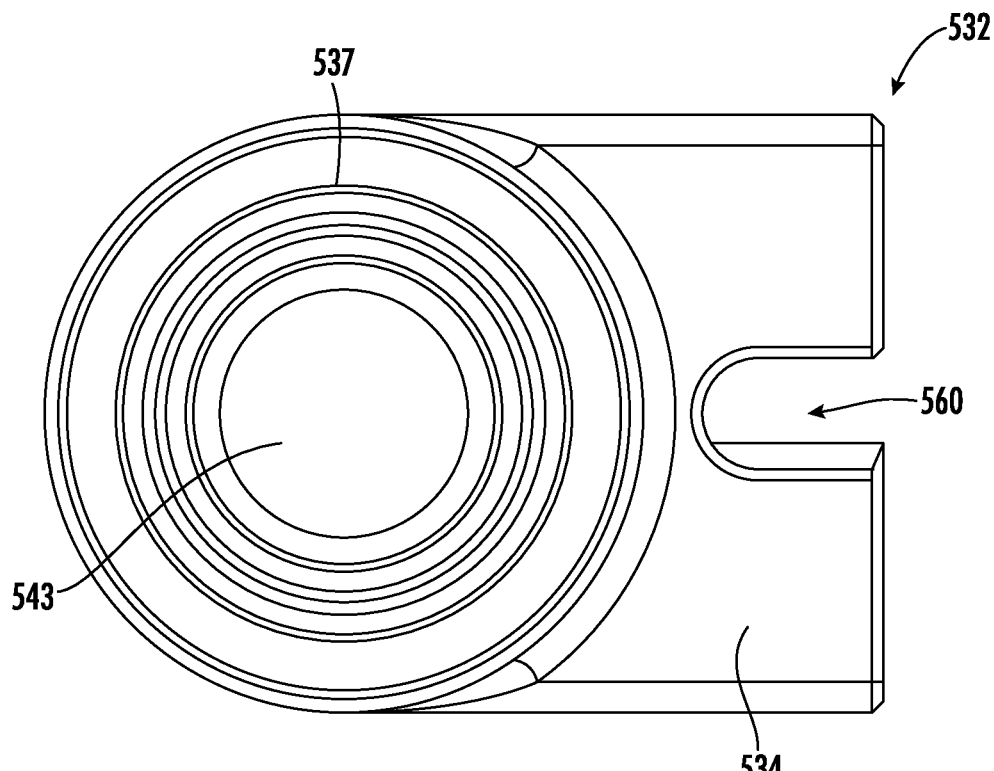
FIG. 20 is a bottom view of the wiring harness of FIG. 14.

Referring to FIGS. 9-12, actuator 500 includes a pair of connection ports 528 and 530. Each port 528 and 530 is configured to receive a connector of a wiring harness. As illustrated, ports 528 and 530 are continuous with one another. In other embodiments, a divider wall is provided between the two ports 528 and 530. As shown in FIG. 12, wiring harness 532 having connector 534 is aligned with port 528 and wiring harness 536 having connector 538 is aligned with port 530. Each port 528 and 530 includes a pair of contacts or terminals 540 and 542 and 544 and 546, respectively. Each connector 534 and 538 includes a corresponding pair of contacts or terminals 548 and 550 and 552 and 554, respectively. The terminals 540, 542, 544, and 546 are operatively connected to the processing circuit 522, motor 518, and other electronic components of actuator 500 so that when the connectors 534 and 538 are secured to the ports 528 and 530 the terminals of ports engage the terminals of the connectors so that the wiring harnesses 532 and 536 may provide electrical power to the electrical components of the actuator 500 and send and receive communication or controls signals between the actuator 500 and one or more external devices or systems (e.g., BMS controller 366, BMS 400, etc.). Each port 528 and 530 also includes one or more locking devices 556 and 558, respectively, to secure a connector of a wiring harness to the port. As illustrated, the locking devices 556 and 558 are bayonet-style snap-lock connectors configured to engage a corresponding recess 560 and 562 in the connector 534 and 538, respectively, to secure the connector in the port (FIGS. 13-15). In other embodiments, other appropriate locking devices may be used. For example, the connector may include the bayonet-style snap-lock connector and the port may include the corresponding recess.

Figure 21:
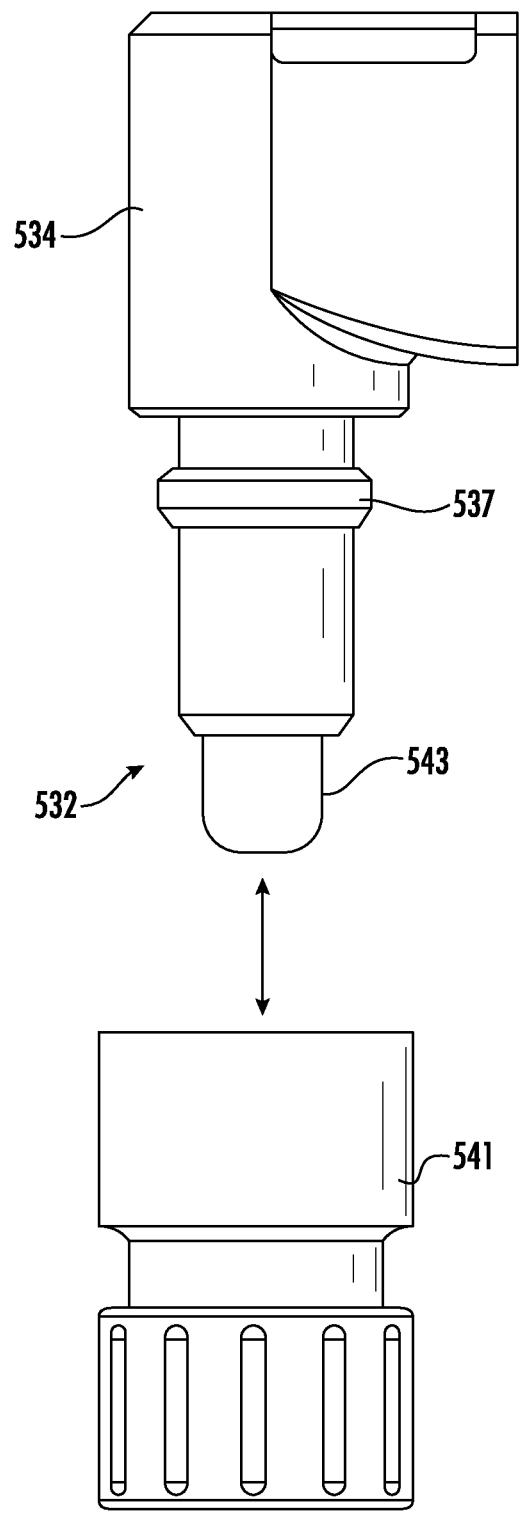
FIG. 21 is an exploded left side view of the wiring harness of FIG. 14 with a conduit connector, according to an exemplary embodiment.
Figure 22:
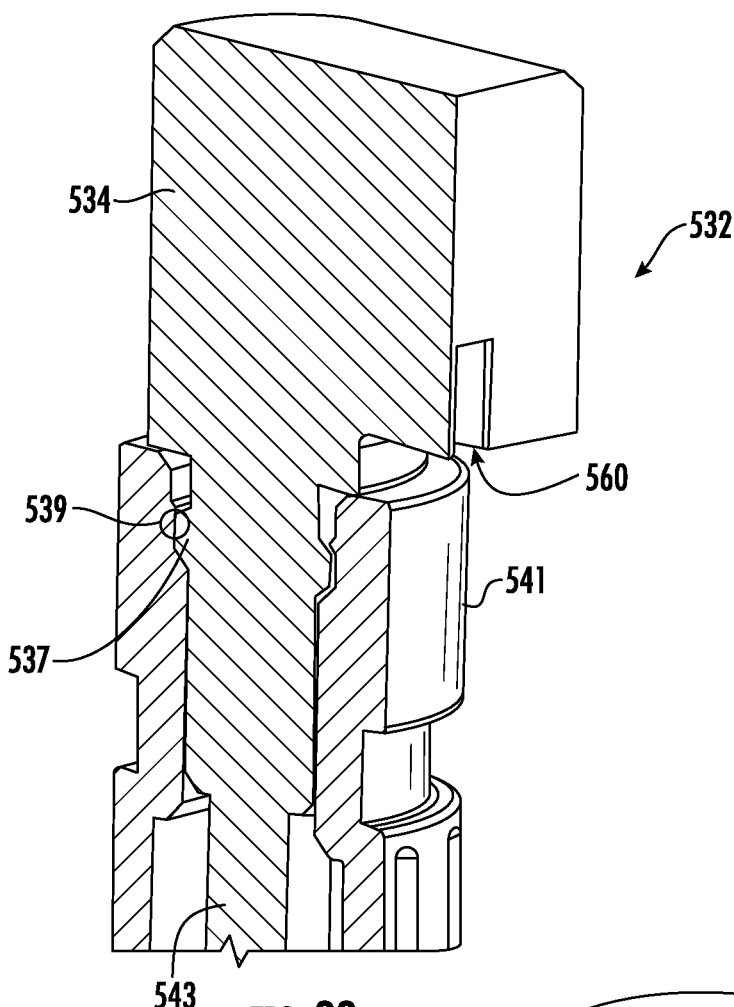
FIG. 22 is a section view of the wiring harness and conduit connector of FIG. 21.
Figure 23:
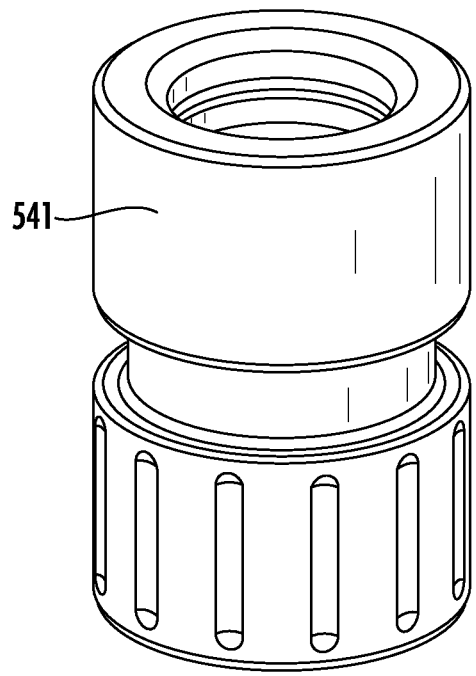
FIG. 23 is a perspective view of the conduit connector of FIG. 21.

As shown in FIGS. 21-23, each connector 534 and 538 includes a flange or ridge 537 that is configured to engage with a corresponding recess 539 in a conduit connector 541. Conduit connector 541 is positioned at the end of a conduit used to house wiring 543 for powering and controlling actuator 500. Ridge 537 engages recess 539 in a snap-fit manner to secure connector 534 or 536 to conduit connector 51.

Figure 24:
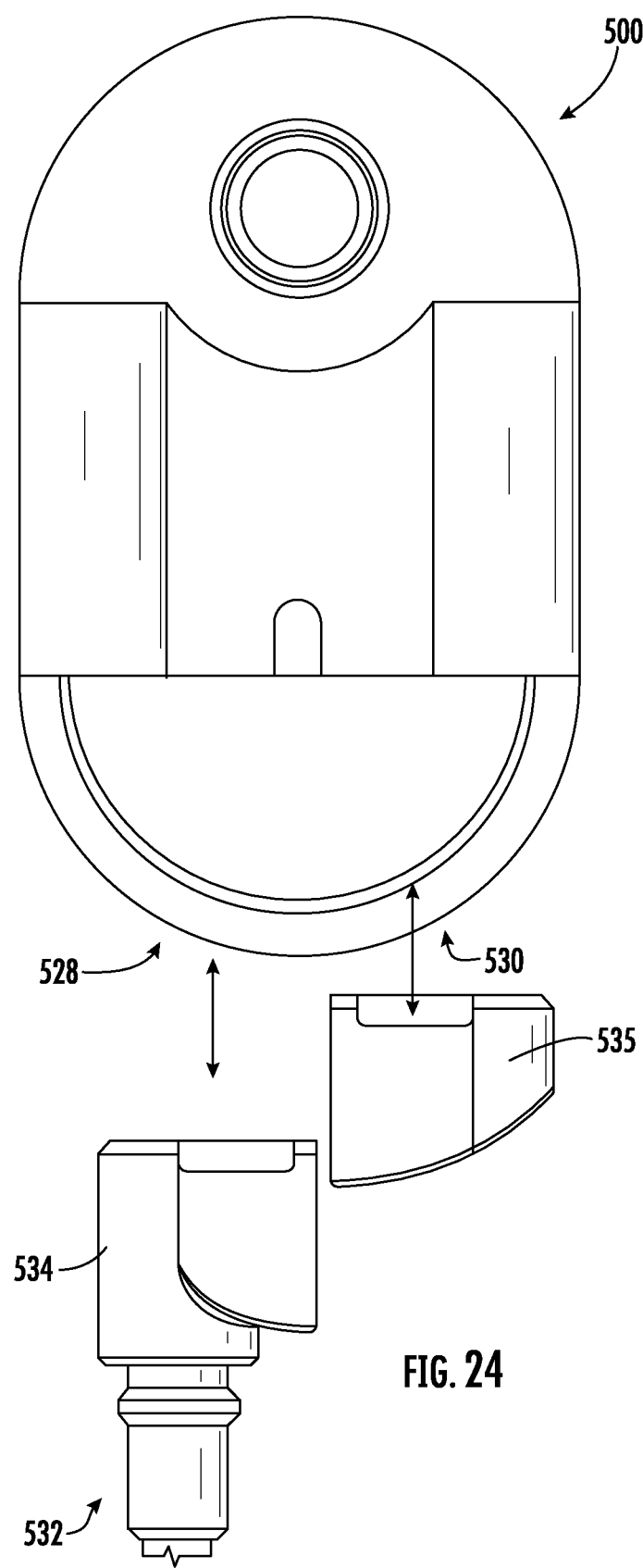
FIG. 24 is an exploded front view of the actuator of FIG. 5, the wiring harness of FIG. 14, and a plug, according to an exemplary embodiment.

In some embodiments, actuator 500 requires two wiring harnesses 532 and 536 to provide sufficient inputs and outputs for power supply and data signals to and from actuator 500. Connectors 534 and 538 are identical mirror images of each other and ports 528 and 530 are identical mirror images of each other so that either connector 534 or 538 can be connected to either port 528 or 530. As shown in FIG. 24, in some embodiments, only a single wiring harness 532 is needed to provide sufficient inputs and outputs for power supply and data signals to and from actuator 500. A plug 535 can be connected to port 528 or 530 that is unused in these embodiments. The plug 535 has the same footprint or perimeter shape as the connectors 534 and 538 and includes a recess to receive a locking device 556 or 558 to secure the plug 535 to the port 528 or 530. The plug 535 shields the otherwise unused port 528 or 530 from dirt, water, and other unwanted contaminants.

Referring to FIGS. 8, 12, and 25-33, housing 502 of actuator 500 includes a base 564 and a removable cartridge 566. Cartridge 566 is available in multiple versions to enable modular construction of actuator 500 with some specific features of actuator 500 determined by which cartridge 566 is attached to base 564. Specific cartridges 566 may be attached to base 564 at the factory or before sale to the end user, providing flexibility to the manufacturer or distributor in producing to stocking particular types of actuators 500. Also, the end-user may install or replace specific cartridges 566 in the field, either simplifying replacement of damaged or malfunctioning cartridges 566 or allowing the user to upgrade or change the specific features of an installed actuator 500 by changing the cartridge 566 rather than the entire actuator 500. Flexibility in stocking and manufacturing can reduce costs. The ability to upgrade or modify actuator 500 in the field allows the end user to change specific features of actuator 500 at lower costs and more easily by only replacing cartridge 566 instead of the entire actuator 500.

Figure 25:
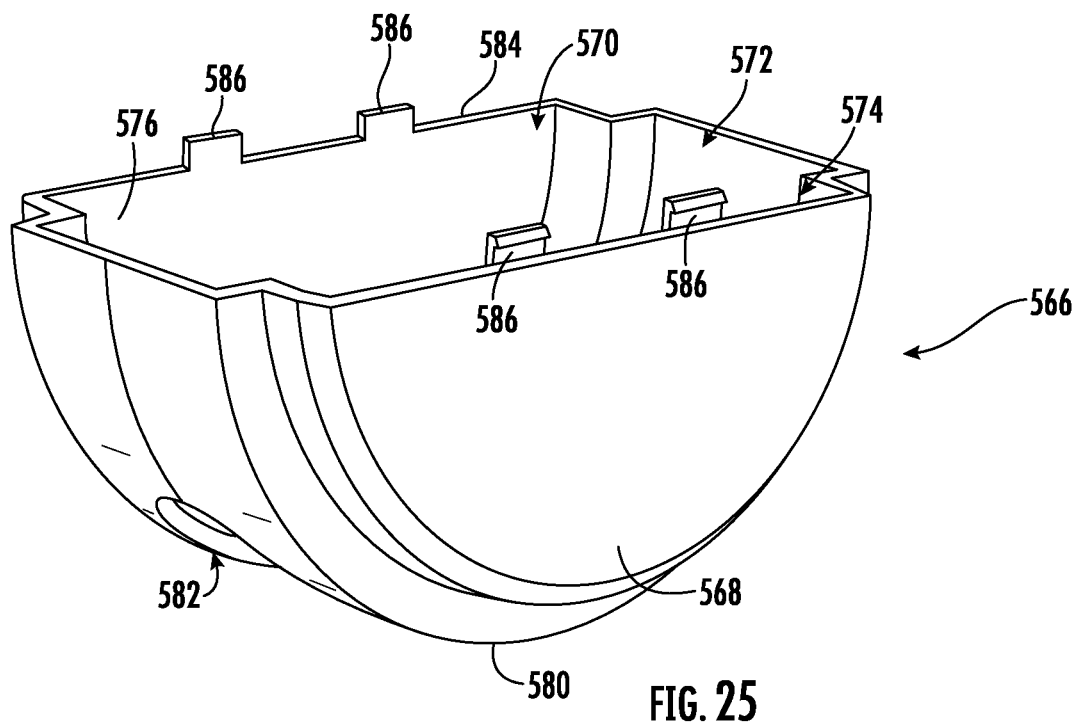
FIG. 25 is a perspective view of a removable cartridge of the actuator of FIG. 5, according to an exemplary embodiment.
Figure 26A:
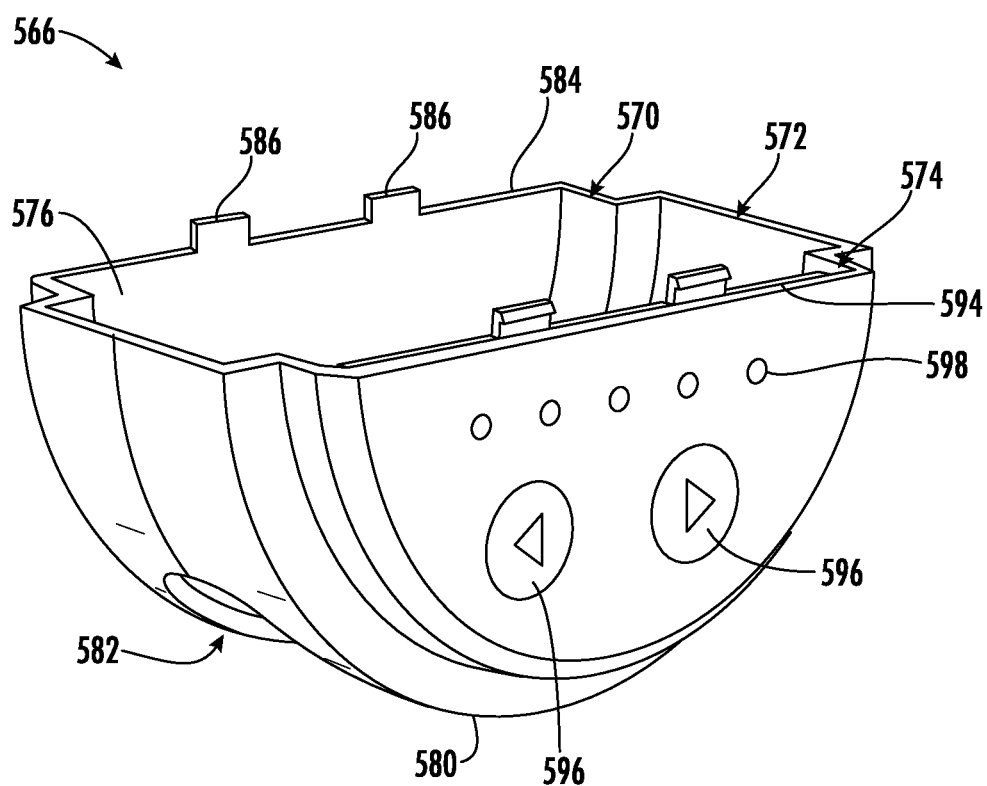
FIG. 26A is a perspective view of a removable cartridge of the actuator of FIG. 5, according to an exemplary embodiment.
Figure 26B:
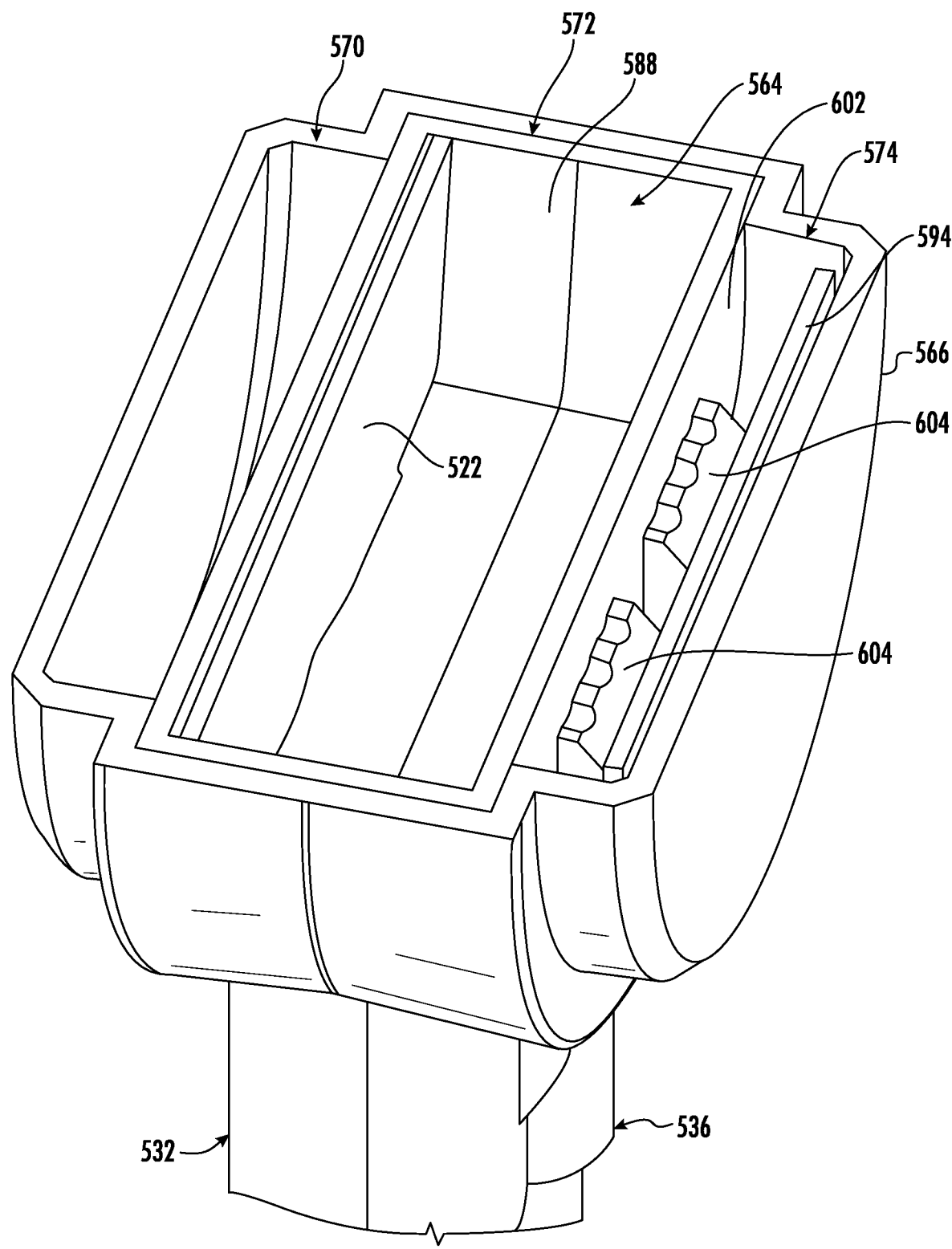
FIG. 26B is a cross-sectional perspective view of the actuator of FIG. 5 and the removable cartridge of FIG. 26A.

As shown in FIGS. 25-26B, cartridge 566 includes a housing 568 defining multiple cavities 570, 572, and 574 formed by one or more walls 576. Bottom 580 of cartridge 566 includes an opening or aperture 582 that allows wiring harnesses (e.g., wiring harnesses 532 and 536) to pass through the cartridge to the connection ports 528 and 530 found in the base 564. Top 584 of cartridge 566 includes locking members 586 for securing cartridge 566 to base 564. As shown in FIGS. 8 and 12, base 564 includes a relatively narrow projection 588 that extends downward from a relatively wider support 590. As shown in FIG. 8, the bottom of the support 590 includes openings or apertures 592, each configured to receive one of locking members 586 of cartridge 566 is a snap-lock arrangement (e.g., locking members 586 are bayonet-style snap-lock connectors). In other embodiments, other types of snap-lock connectors may be used. In some embodiments, the snap-lock connectors may be supplemented by mechanical fasters (e.g., nuts and bolts, screws, buckles, etc.) to further secure cartridge 566 to base 564.

As shown in FIG. 25, in one embodiment, cartridge 566 is a "blank" cartridge and does not provide any additionally functionality to base 564 of actuator 500 and simply covers projection 588 of base 564 when cartridge 566 is attached to base 564.

Figure 31:
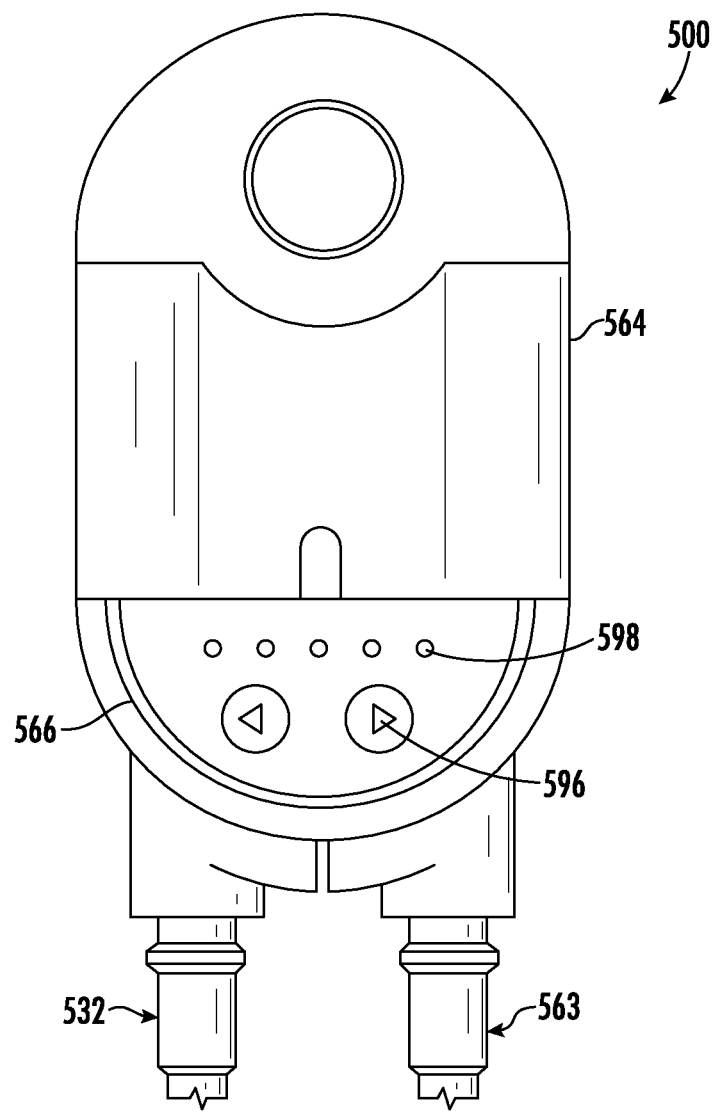
FIG. 31 is a front view of an actuator, according to an exemplary embodiment.

As shown in FIGS. 26A-33, in other embodiments, cartridge 566 is a "smart" cartridge and includes processing circuit 594 and one or more input devices 596 (e.g., button, switch, dial, knob, touchscreen, keypad, etc.) and one or more output devices 598 (e.g., light, light emitting diode (LED), display screen, speaker, buzzers, etc.) to provide additional functionality for actuator 500. Processing circuit 594 is similar in composition to processing circuit 522 described above and enables the functionality specific to a particular smart cartridge. As shown in FIG. 31, in one embodiment, cartridge 566 includes two buttons 596 and multiple LEDs 598 capable of lighting in different sequences and/or colors to provide particular information to a user. Buttons 596 enable user to calibrate or configure actuator 500 via processing circuits 594 and 522. For example, user can perform a test that causes drive shaft 512 to move in a predetermined manner while motor 518 is monitored to test motor 518. User can then use buttons 596 to calibrate motor 518 in response to the test results. In some embodiments, smart cartridges 566 also include a communications gateway (e.g., Wi-Fi, Bluetooth, Zigbee, etc.) to enable wireless communication to and from actuator 500). In some, cartridges 566 may also include other electronic components suitable for adding functionality, communications, inputs, displays or other user feedback, etc.

Figure 32:
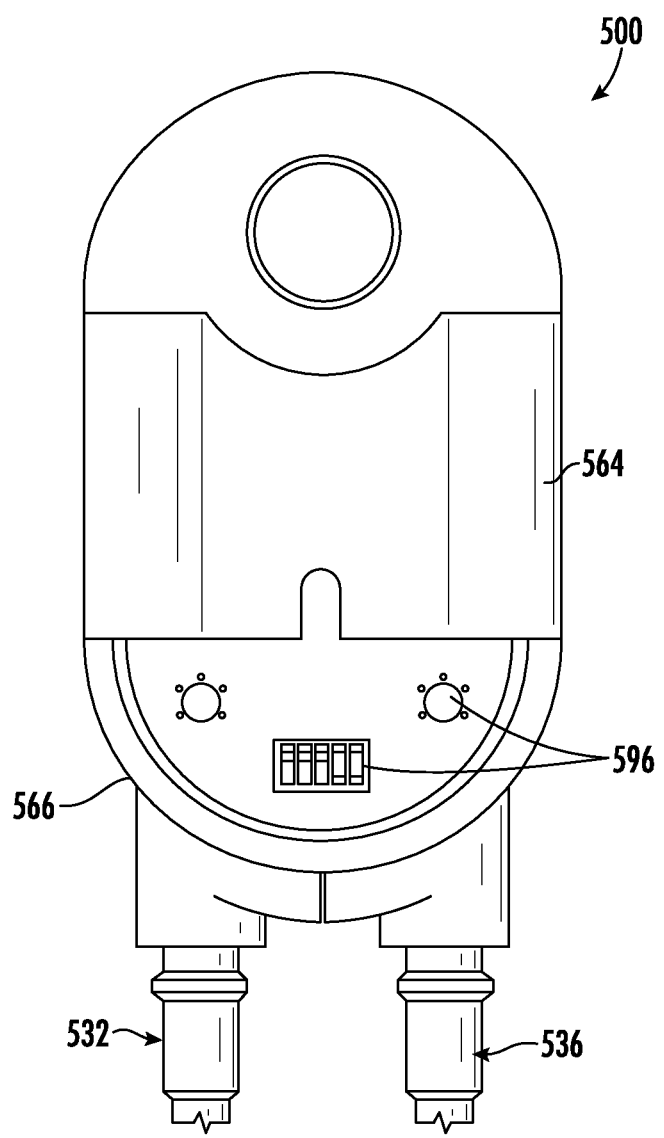
FIG. 32 is a front view of an actuator, according to an exemplary embodiment.
Figure 33:
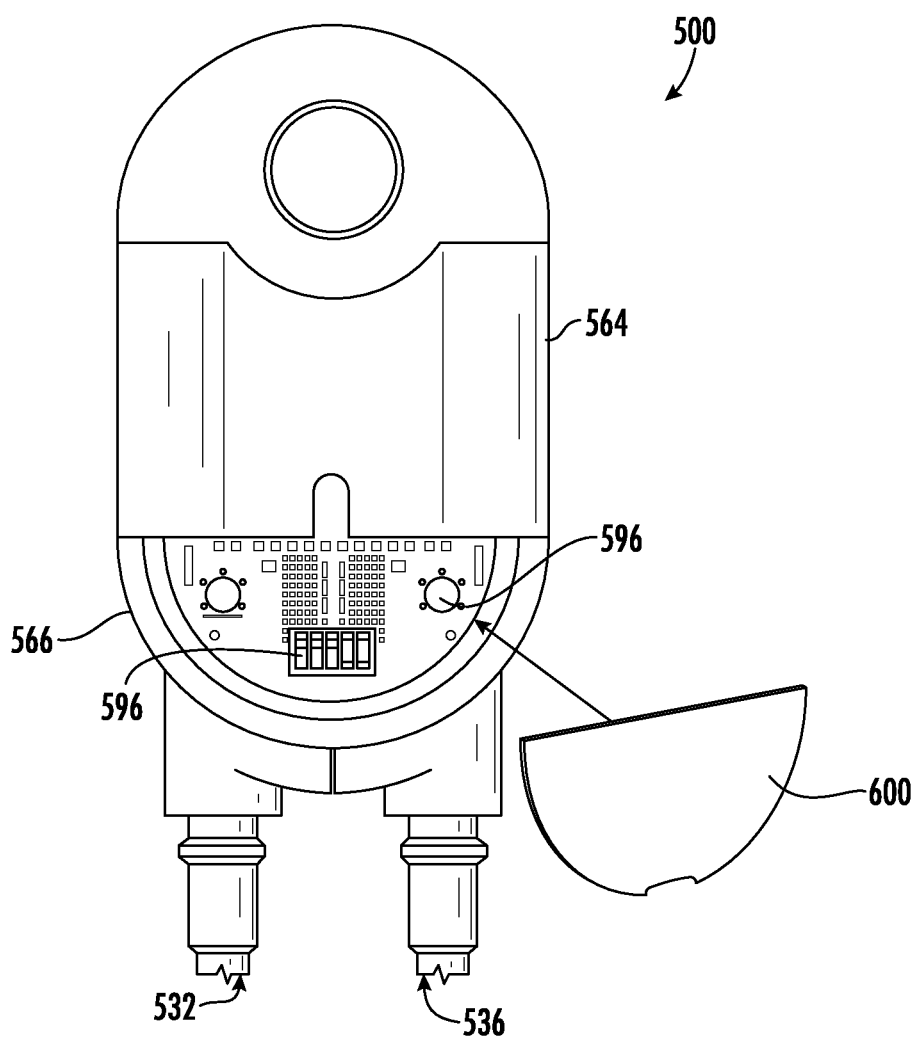
FIG. 33 is a front view of an actuator, according to an exemplary embodiment.

As shown in FIG. 32-33, in some embodiment cartridge 566 includes one or more dials 596 and one or more rocker switches 596 rather than buttons 596 and LEDs 598 of FIG. 31. In FIG. 32, the dials 596 and rocker switches 596 are on located on the outside of cartridge 566 and exposed for use by the user. In FIG. 33, cartridge 566 includes a removable cover 600 that is used to cover dials 596 and rocker switches 596 when dials 596 and rocker switches 596 are not in use.

As shown in FIGS. 8 and 26B, when cartridge 566 is attached to base 564, projection 588 of base 564 is received within cavity 572 of cartridge 566. Projection 588 and cavity 572 have substantially the same shape, with projection 588 slightly smaller in size than cavity 572 so that projection 588 may be positioned within cavity 572. Outer surface or face 602 of projection 588 (e.g., the front face of projection 588) includes multiple terminals 604 for electrically connecting processing circuit 594 of cartridge 566 to processing circuit 522 or other electronic components of base 564. As shown in FIGS. 27-28, in some embodiments, terminals 604 are screw terminals so that processing circuit 594 is hardwired to terminals 604 to complete the electrical circuit. As shown in FIGS. 29-30, in other embodiments, terminals 604 are contact terminals so that corresponding contact terminals on processing circuit 594 come into contact with terminals 604 to complete the electrical circuit when cartridge 566 is attached to base 564. Processing circuit 594 is positioned in cavity 574 of cartridge 566 so that processing circuit 594 is positioned proximate or near terminals 604 when cartridge 566 is attached to base 564. An additional processing circuit or other electronic components (e.g., power transformer, converter, power supply, battery, one or more sensors (e.g., temperature sensor) can be positioned in the other cavity 570 of cartridge 566 and can be electrically connected to the electronic components of base 564 either via processing circuit 594 and terminals 604 or by a similar arrangement of similar terminals on the opposite surface or face of projection 588 (e.g., the rear face of projection 588).

Figure 36:
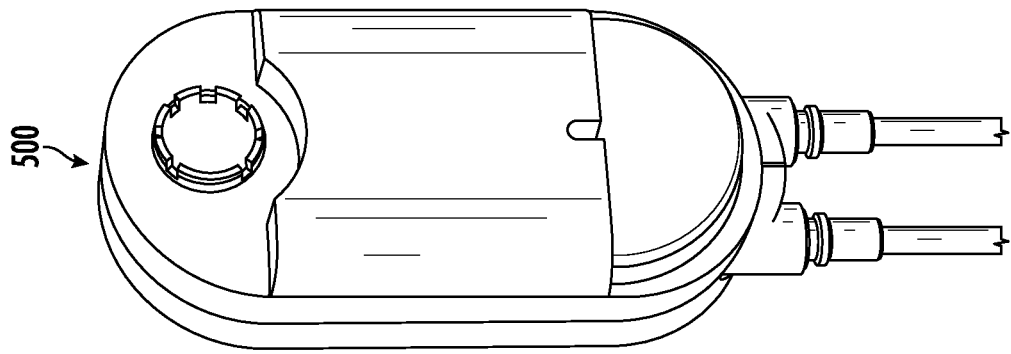
FIG. 36 is a front view of an actuator, according to an exemplary embodiment.
Figure 35:
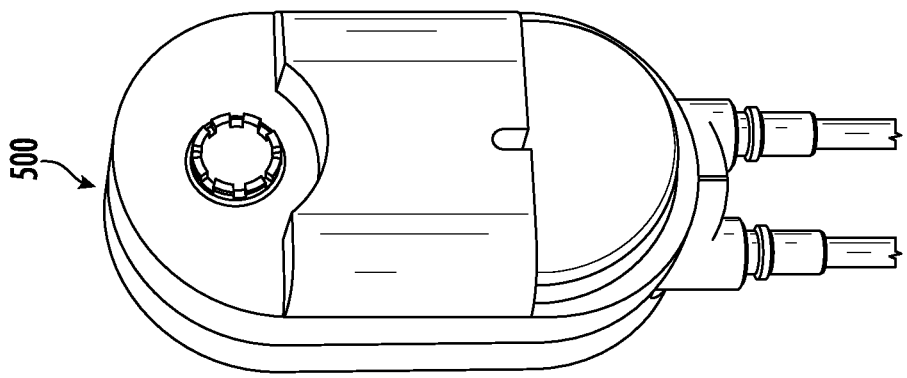
FIG. 35 is a front view of an actuator, according to an exemplary embodiment.
Figure 34:
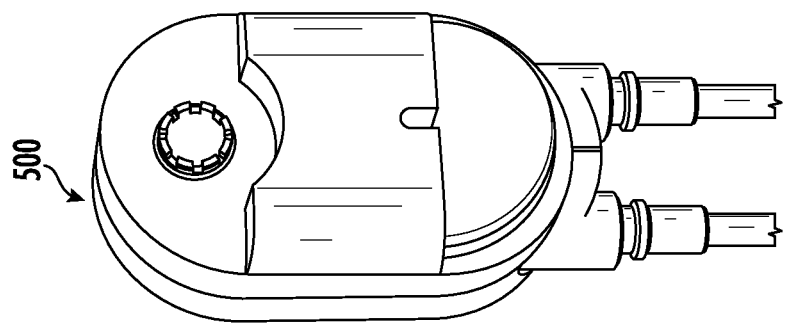
FIG. 34 is a front view of an actuator, according to an exemplary embodiment.

In different embodiments, as shown in FIGS. 34-36, actuator 500 is rated at different torque outputs, for example, 2 Newton-meters (FIG. 34), 4 Newton-meters (FIG. 35), and 10-20 Newton-meters (FIG. 36). In other embodiments, actuator 500 is rated for different torques. Different torque ratings may require different physical dimensions of actuator 500 (e.g., relatively high torque rating may require larger actuator than lower rated actuators to accommodate the components needed to produce the higher torque). In some embodiments, cartridges 566 must be paired with base 564 having the same rated torque output (e.g., 2 Newton-meter cartridge 566 must be used with 2 Newton-meter base 564). In other embodiments, cartridges 566 may be paired with bases 564 having different rated torque outputs (e.g., 2 Newton-meter cartridge 566 can be used with any of 2 Newton-meter, 4 Newton-meter, and 10-20 Newton-meter bases 564).

Figure 37:
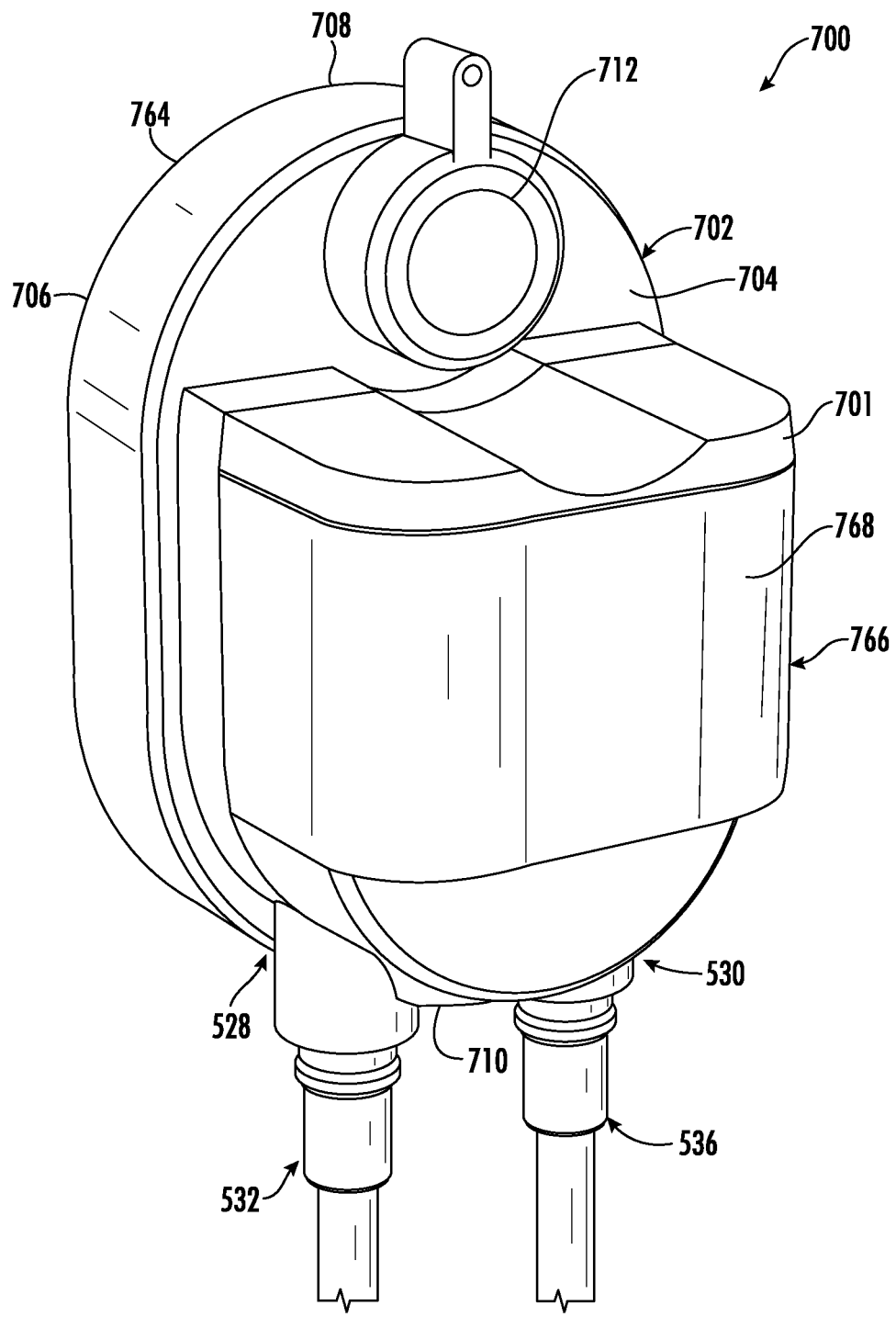
FIG. 37 is a perspective view of an actuator, according to an exemplary embodiment.
Figure 38:
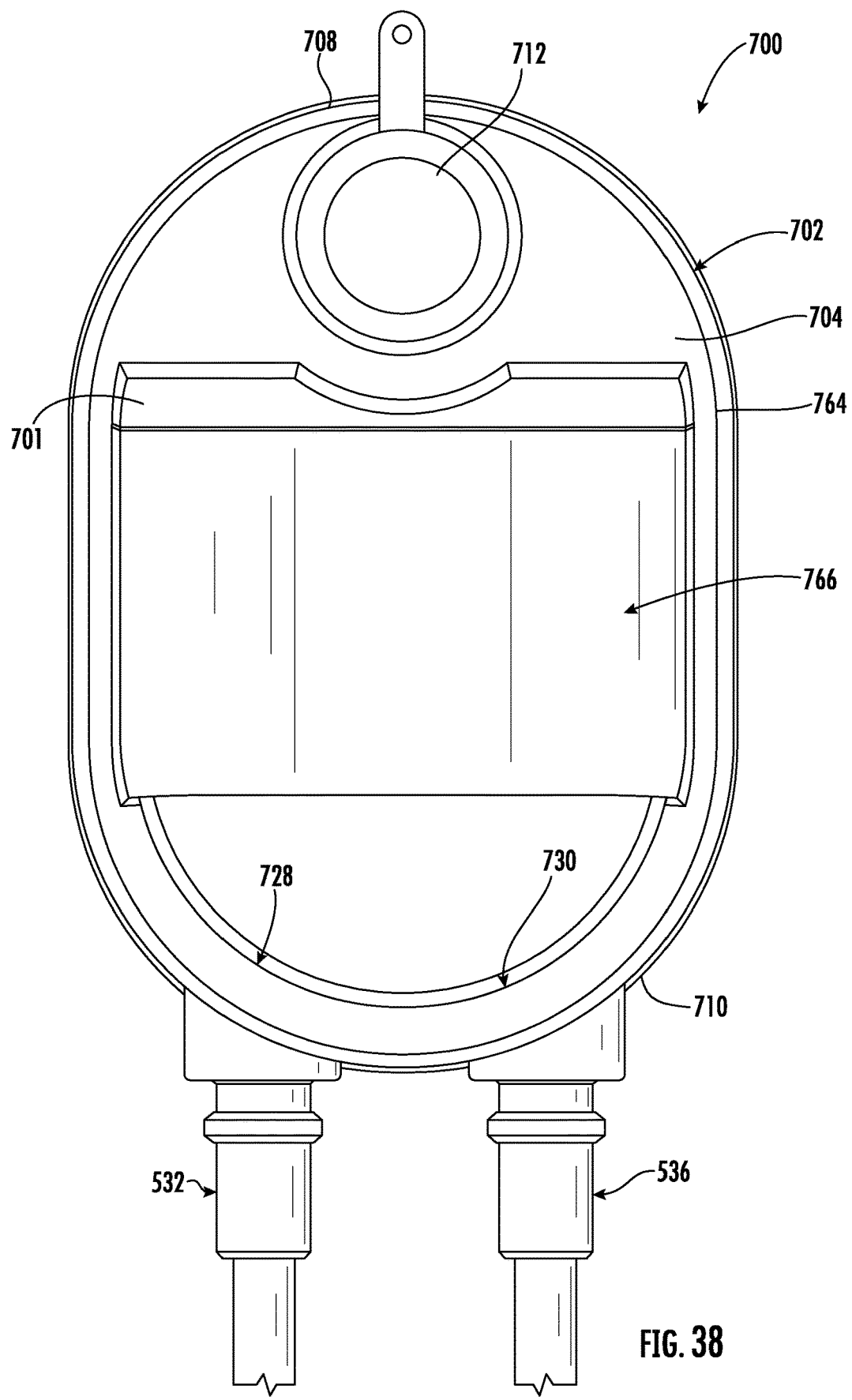
FIG. 38 is a front view of the actuator of FIG. 37.
Figure 39:
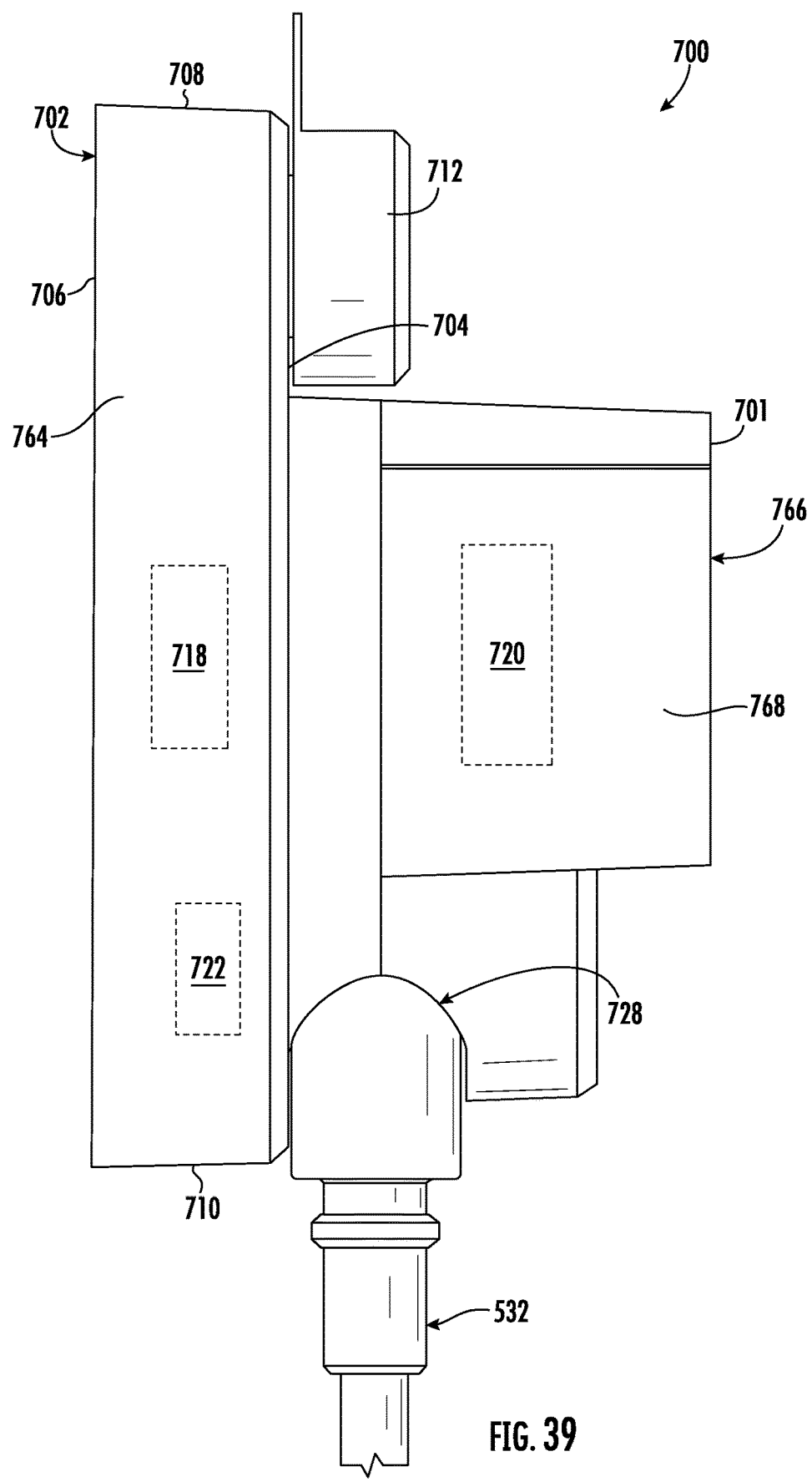
FIG. 39 is a left side view of the actuator of FIG. 37.

Referring now to FIGS. 37-39, an actuator 700 for use in a HVAC system is shown, according to an exemplary embodiment. Actuator 700 includes components similar to those described above for actuator 500, including housing 702 having a front side 704, a rear side 706, a top side 708, and a bottom side 710, a drive device illustrated as drive hub or drive shaft 712, a motor 718, a gear box or transmission 720, and processing circuit 722.

Figure 40:
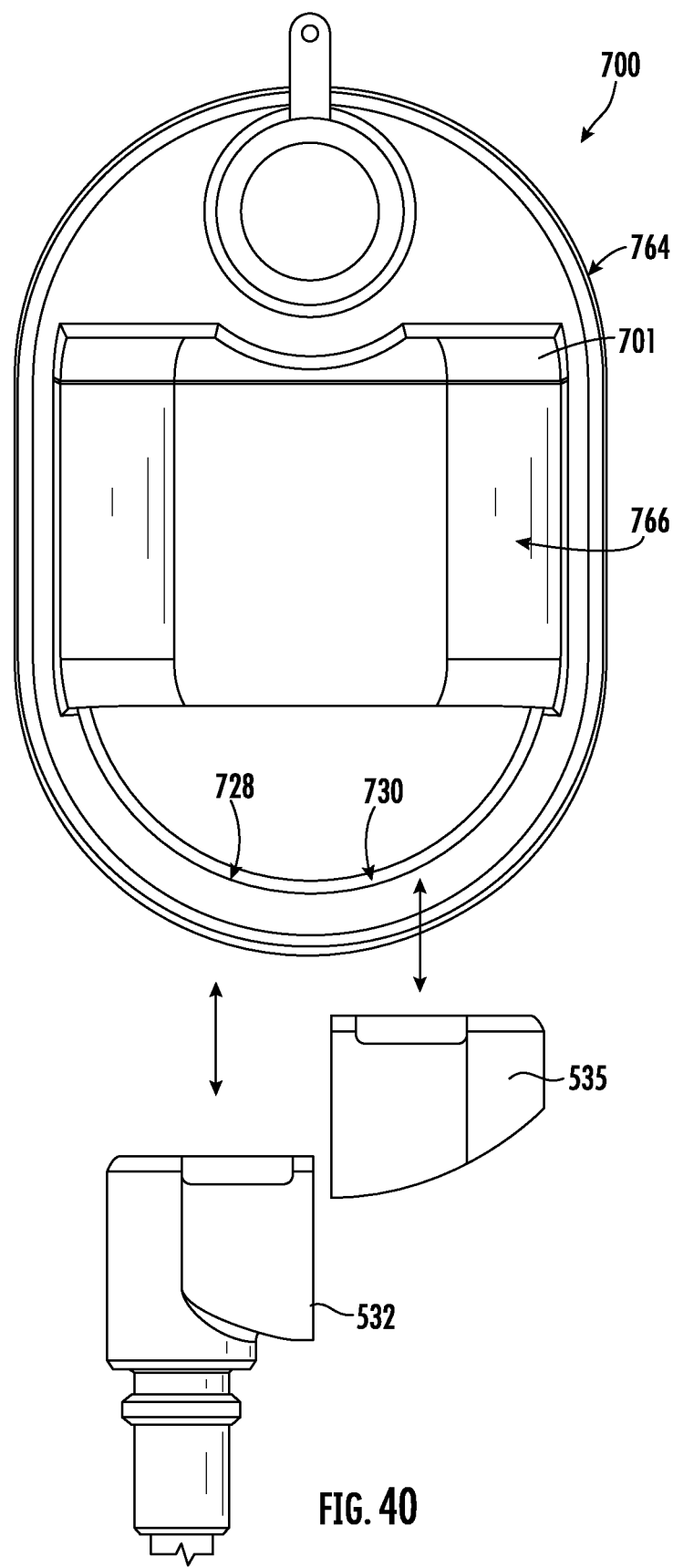
FIG. 40 is an exploded front view of the actuator of FIG. 37, the wiring harness of FIG. 14, and the plug of FIG. 24.

As shown in FIG. 40, actuator 700 also includes connection ports 728 and 730. Connection ports 728 and 730 are identical to connection ports 528 and 530 described above. This allows the same or "universal" wiring harnesses 532 and 536 and plugs 535 as actuator 500. This allows actuators 500 and 700 to be swapped for one another in the field without rewiring. The actuator 500 or 700 to be replaced can be disconnected from the wiring harness or harnesses 532 and 536, replaced with the new actuator 700 or 500, and the wiring harness or harnesses 532 and 536 reconnected to the new actuator 700 or 500. A plug 535 can be installed if the number of harnesses needed for the new actuator 700 or 500 is one instead of two for the old actuator 500 or 700.

Figure 41:
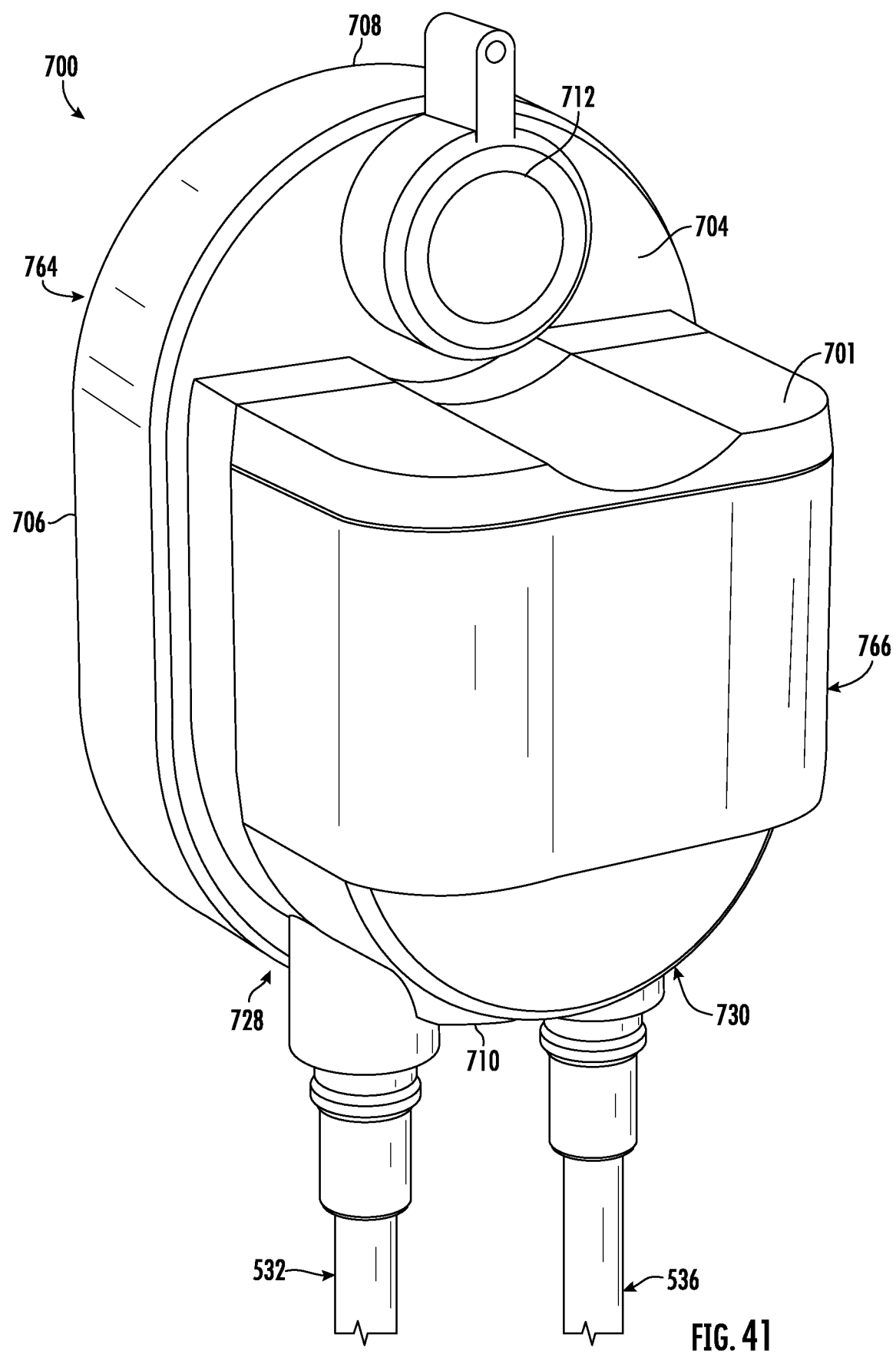
FIG. 41 is a perspective view of an actuator, according to an exemplary embodiment.
Figure 42:
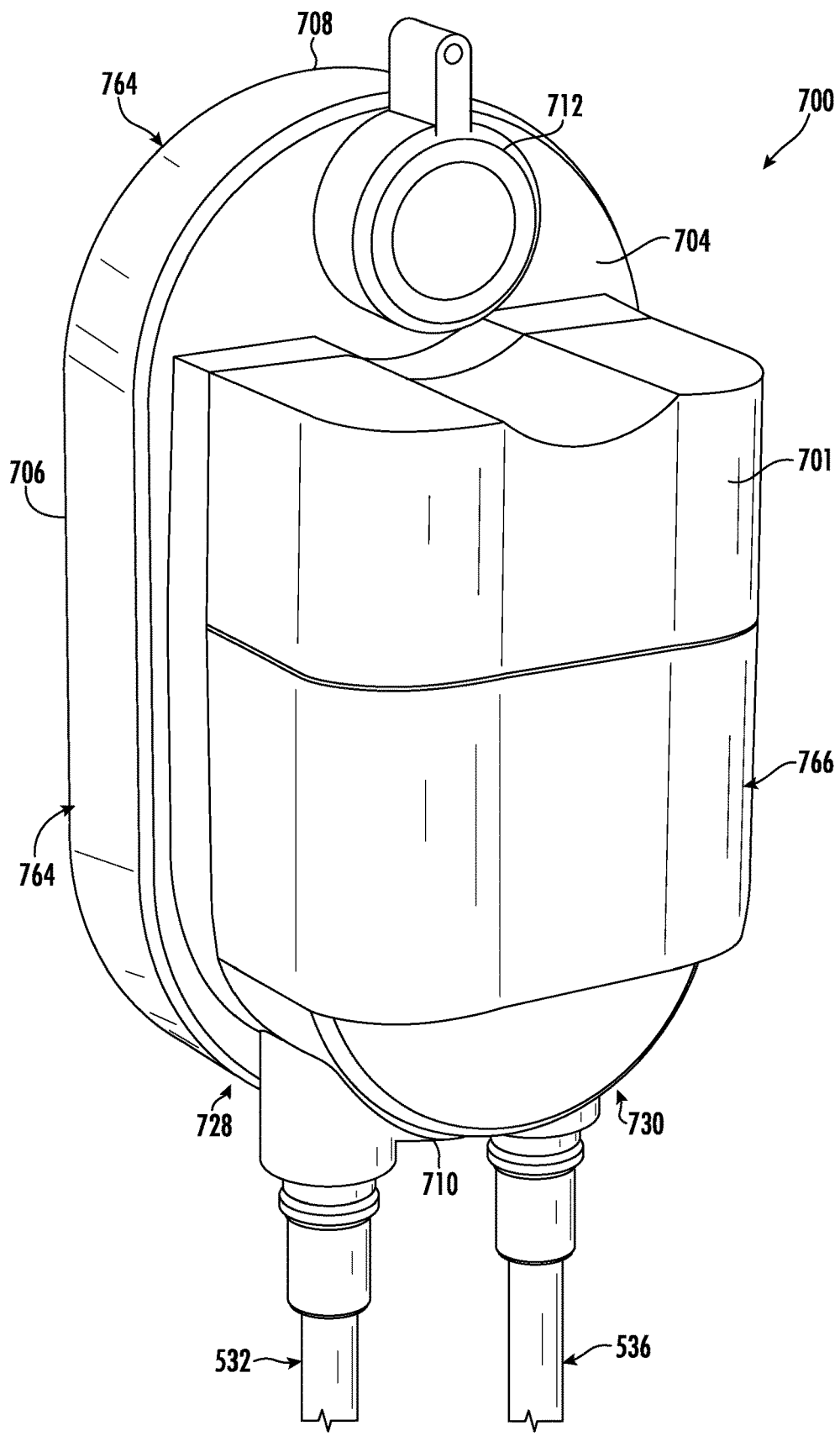
FIG. 42 is a perspective view of an actuator, according to an exemplary embodiment.

As shown in FIGS. 37-39 and 41-42, housing 702 of actuator 700 includes a base 764 and a removable cartridge 766. Cartridge 766 includes a housing 768 containing transmission 720. Cartridge 766 is available in multiple versions, each with a different transmission 720 (e.g., providing a different gear ratio) to enable modular construction of actuator 700 with specific features of actuator 700 determined by which cartridge 766 is attached to base 764 (e.g., a cartridge providing a higher rated torque, a cartridge providing a lower rated torque, etc.). Specific cartridges 766 may be attached to base 764 at the factory or before sale to the end user, providing flexibility to the manufacturer or distributor in producing to stocking particular types of actuators 700. Also, the end-user may install or replace specific cartridges 766 in the field, either simplifying replacement of damaged or malfunctioning cartridges 766 or allowing the user to upgrade or change the specific features of an installed actuator 700 by changing the cartridge 766 rather than the entire actuator 700. Flexibility in stocking and manufacturing can reduce costs. The ability to upgrade or modify actuator 700 in the field allows the end user to change specific features of actuator 700 at lower costs and more easily by only replacing cartridge 766 instead of the entire actuator 700. As shown in FIGS. 41-42, cartridge 766 may be attached to bases 764 having different physical dimensions.

As shown in FIGS. 34-39 and 41-42, cartridge 766 is positioned below an upper projection 701 when attached to base 764. Transmission 720 includes an input connected to motor 718 and an output connected to drive shaft 712. The input may be directly connected motor 718 (e.g., by coupling the output shaft of motor 718 directly to an input shaft of transmission 720) or indirectly connected to motor 718 (e.g., by coupling the output shaft of motor 718 to a transmission (e.g., one or more gears, pulleys connected by belts, etc.) which is then coupled to an input shaft of transmission 720). Output may be directly or indirectly connected to drive shaft 712 is similar manners. In some embodiments, motor 718 is positioned within base 764. In other embodiments, motor 718 is positioned within cartridge 766 with transmission 720. Cartridge 766 may be attached base 764 using snap-lock connections as described above with respect to actuator 500 or other appropriate attachment features.

In some embodiments, an actuator includes the features of both actuator 500 and actuator 700 so that the actuator includes two removable cartridges (one for modifying functionality by changing electronic components as described with respect to actuator 500 and one for changing transmissions as described with respect to actuator 700) or a single removable cartridge including both the electronic components as described with respect to actuator 500 and the transmission (and motor in some embodiments) as described with respect to actuator 700.

An Appendix describing the above features and other features of the described actuators is attached to and forms part of this application. In the Appendix, the 9400 series of actuators generally corresponds to actuator 500 and the 9300 series and Smart series of actuators generally correspond to actuator 700.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the description may describe a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator for an HVAC system, the actuator comprising:
    a base including:
        a motor; and
        a drive device driven by the motor and configured to be coupled to a movable HVAC component for driving the movable HVAC component between multiple positions; and
    a removable cartridge removably attached to the base, the removable cartridge comprising a transmission having an input connected to the motor and an output connected to the drive device, wherein the removable cartridge is smaller than the base.

2. The actuator of claim 1, wherein the removable cartridge includes an input device, an output device, and a processing circuit.

3. The actuator of claim 1, wherein the removable cartridge includes an input device and a processing circuit.

4. The actuator of claim 1, wherein the drive device defines an opening configured to receive a shaft of the HVAC component.

5. The actuator of claim 1, wherein the base includes a base processing circuit, a first connection port, and a second connection port electrically coupled to the base processing circuit.

6. The actuator of claim 5, wherein the second connection port is a mirror image of the first connection port.

7. The actuator of claim 5, wherein the removable cartridge includes an input device and a cartridge processing circuit.

8. The actuator of claim 7, wherein the base includes a plurality of base terminals and the cartridge includes a plurality of cartridge terminals and wherein the base terminals engage the cartridge terminals to complete an electric circuit when the cartridge is attached to the base.

9. The actuator of claim 7, wherein the base includes a projection and a plurality of base terminals located on the projection;
    wherein the cartridge defines a cavity; and
    wherein the cavity receives the projection when the cartridge is attached to the base so that the base terminals are located near the cartridge processing circuit.

10. An actuator for an HVAC system, the actuator comprising:
    a base including a motor and a drive device driven by the motor and configured to be coupled to a movable HVAC component for driving the movable HVAC component between multiple positions; and
    a removable cartridge removably attached to the base, wherein the cartridge includes a cartridge processing circuit and a transmission, wherein the transmission comprises an input connected to the motor and an output connected to the drive device, and wherein the removable cartridge is smaller than the base.

11. The actuator of claim 10, wherein the removable cartridge also includes an input device and an output device.

12. The actuator of claim 10, wherein the removable cartridge includes an input device.

13. The actuator of claim 12, wherein the input device is at least one of a button, a switch, a dial, a knob, a touchscreen, and a keypad.

14. The actuator of claim 10, wherein the base includes a base processing circuit, a first connection port, and a second connection port electrically coupled to the base processing circuit.

15. The actuator of claim 14, wherein the second connection port is a mirror image of the first connection port.

16. The actuator of claim 14, wherein the base includes a plurality of base terminals and the cartridge includes a plurality of cartridge terminals and wherein the base terminals engage the cartridge terminals to complete an electric circuit when the cartridge is attached to the base.

17. The actuator of claim 14, wherein the base includes a projection and a plurality of base terminals located on the projection;
   wherein the cartridge defines a cavity; and
   wherein the cavity receives the projection when the cartridge is attached to the base so that the base terminals are located near the cartridge processing circuit.

18. An actuator for an HVAC system, the actuator comprising:
   a base including a drive device configured to be coupled to a movable HVAC component for driving the movable HVAC component between multiple positions; and
   a removable cartridge removably attached to the base, wherein the cartridge includes a transmission having an output connected to the drive device, and wherein the removable cartridge is smaller than the base.

19. The actuator of claim 18, wherein the base includes a motor connected to an input of the transmission.

20. The actuator of claim 18, wherein the cartridge includes a motor connected to an input of the transmission.

\* \* \* \* \*